(12) United States Patent
Hell et al.

(10) Patent No.: US 8,617,827 B2
(45) Date of Patent: Dec. 31, 2013

(54) PHOTOACTIVABLE FLUORESCENT DYES FOR OPTICAL MICROSCOPY AND IMAGING TECHNIQUES

(75) Inventors: Stefan W. Hell, Goettingen (DE); Vladimir N. Belov, Goettingen (DE); Vadim P. Boyarskiy, St. Petersburg (RU); Christian A. Wurm, Goettingen (DE); Stefan Jakobs, Goettingen (DE); Claudia Geisler, Goettingen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 0 days.

(21) Appl. No.: 13/395,323

(22) PCT Filed: Sep. 10, 2009

(86) PCT No.: PCT/EP2009/006578
§ 371 (c)(1),
(2), (4) Date: Apr. 24, 2012

(87) PCT Pub. No.: WO2011/029459
PCT Pub. Date: Mar. 17, 2011

(65) Prior Publication Data
US 2012/0202216 A1    Aug. 9, 2012

(51) Int. Cl.
  *G01N 33/53* (2006.01)
  *C07D 285/06* (2006.01)
  *C12Q 1/02* (2006.01)
  *C09B 46/00* (2006.01)

(52) U.S. Cl.
  USPC ............... 435/7.1; 435/29; 534/659; 548/127

(58) Field of Classification Search
  USPC ................. 435/7.1, 29; 534/659; 548/127
  See application file for complete search history.

(56) References Cited

U.S. PATENT DOCUMENTS 5,635,608 A    6/1997  Haugland et al.
7,304,168 B2   12/2007 Li et al.

FOREIGN PATENT DOCUMENTS

WO    9208720 A1    5/1992

OTHER PUBLICATIONS

Banerjee et al., "Toward the Development of New Photolabile Protecting Groups That Can Rapidly Release Bioactive Compounds upon Photlysis with Visible Light", J. Org. Chem., vol. 68, pp. 8361-8367 (2003).
Belov et al., "Rhodamines NN: A Novel Class of Caged Fluorescent Dyes", Angew. Chem. Int. Ed., vol. 49, pp. 3520-3523 (2010).
Egner et al., "Fluorescence Nanoscopy in Whole Cells by Asynchronous Localization of Photoswitching Emitters", Biophysical Journal, vol. 93, pp. 3285-3290 (2007).
Fedoryak et al., "Brominated Hydroxyquinoline as a Photolabile Protecting Group with Sensitivity to Multiphoton Excitation", Organic Letters, vol. 4, No. 20, pp. 3419-3422 (2002).
Furuta et al., "Brominated 7-hydroxycoumarin-4-ylmethyls: Photolabile protecting groups with biologically useful cross-sections for two photon photolysis", Proc. Natl. Acad. Sci. USA, vol. 96, pp. 1193-1200 (1999).
G.T. Hermanson Bioconjugate Techniques, Academic Press, Elsevier, pp. 272-274 (1996).
Gee et al., Caged Q-Rhodamine Dextran: A New Photoactivated Fluorescent Tracer, Bioorganic & Medicinal Chemistry Letters, vol. 11, pp. 2181-2183 (2001).
Gunzenhauser et al., "Halochromic Molecules. Synthesis and Acidobasic Behaviour of Substituted 3',6'-Bis(dimethylamino)-spiro[5H-imidazo[2,1-alpha]isoindolin-5,9'-xanthenes]", Helvetica Chimica Acta, vol. 62, Fasc. 1, pp. 171-184 (1979).
Gunzenhauser et al., "Halochromic Molecules. Substituted 6,11-Dihydrospirol[[1]benzopyrano[4,3-b]indol-6,9'-9'H-xanthene]-2',6'-diamines and Their Aza Analogues: New Chromogenes for Black Images", Helvetica Chimica Acta, vol. 73, pp. 359-379 (1990).

(Continued)

Primary Examiner — Yong Chu
(74) Attorney, Agent, or Firm — Caesar, Rivise, Bernstein, Cohen & Pokotilow, Ltd.

(57) ABSTRACT

The present invention relates to novel photoactivable rhodamine or carbopyronine derivatives of the following general formulae G1-G4 (I), G1: A1=O, A2=N, A3=C; G2: A1=S, A2=N, A3=C; G3: A1=O, A2=O, A3=N; G4: A1=S, A2=O, A3=N; comprising UV light absorbing chromophores which after photolysis by irradiation at 254-490 nm (preferably at 375-420 nm) generate fluorescent rhodamine or carbopyronine derivatives and small non-toxic fragments such as $N_2$ or $N_2O$. The invention also relates to methods for preparing such compounds and to the use of these compounds for optical microscopy and imaging techniques.

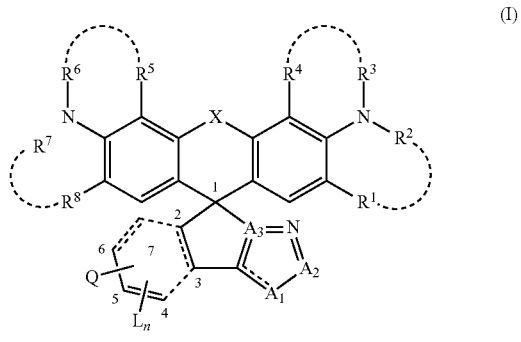

G1 - G4

19 Claims, 3 Drawing Sheets

(56) References Cited

OTHER PUBLICATIONS

Figure 1:
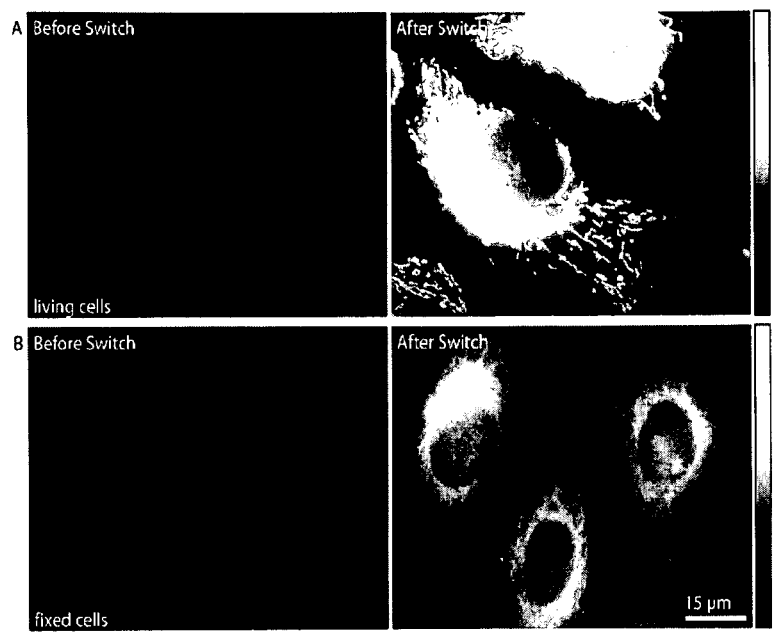

Kirmse, "100 Years of the Wolff Rearrangement", Eur. J. Org. Chem., pp. 2193-2256 (2002).
Kobayashi et al., "Highly Activatable and Rapidly Releasable Caged Fluorescein Derivatives", J. Am. Chem. Soc., vol. 129, pp. 6696-6697 (2007).
Krafft et al., "Photoactivable Fluorophores. 3. Synthesis and Photoactivation of Fluorogenic Difunctionalized Fluoresceins", J. Am. Chem. Soc., vol. 110, pp. 301-303 (1988).
Krauss et al., "Zur Photolyse Von 1,2,3-Thiadiazolen-II", Tetrahedron, vol. 27, pp. 5953-5957 (1971).
Lavis et al., "Fluorogenic Label for Biomolecular Imaging", ACS Chemical Biology, vol. 1, No. 4, pp. 252-260 (2006).
Levinson et al., "The Synthesis of Acenaphtho[1,2-c][1,2,3]Thiadiazole and Phenanthro[9,10-c][1,2,3]Thiadiazole", Heterocycles, vol. 19, No. 2, pp. 241-243 (1982).
Lin et al., "A Strategy for the Construction of Caged Diols Using a Photolabile Protecting Group", J. Org. Chem., vol. 67, pp. 2723-2726 (2002).
Majjigapu et al., "Release and Report: A New Photolabile Caging System with a Two-Photon Fluorescence Reporting Function", J. Am. Chem. Soc., vol. 127, pp. 12458-12459 (2005).
Matsuzaki et al., "Dendritic spine geometry is critical for AMPA receptor expression in hippocampal CA1 pyramidal neurons", Nature Neuroscience, vol. 4, No. 11, pp. 1086-1092 (2001).
Molho et al., "Optimization of Turn Geometries for Microchip Electrophoresis", Anal. Chem., vol. 73. No. 6, pp. 1350-1360.
Montgomery et al., "Photo-Control of Nitric Oxide Synthase Activity Using a Caged Isoform Specific Inhibitor", Bioorganic & Medicinal Chemistry, vol. 10, pp. 1919-1927 (2002).
Nishio et al., "Photochemistry of Thioamides", Reviews on Heteroatom Chemistry, vol. 12, pp. 23-52 (1995).
Ottl et al., "Preparation and Photoactivation of Caged Fluorophores and Caged Proteins Using a New Class of Heterobifunctional, Photocleavable Cross-Linking Reagents", Bioconjugate Chemistry, vol. 9, No. 2, pp. 143-151 (1998).
Paul et al., "Imaging of Pressure- and Electrokinetically Driven Flows through Open Capillaries", Anal. Chem., vol. 70, pp. 2459-2467 (1998).
Sakamoto et al., "The Photochemistry of Thioamides and Thioimides", CRC Handbook of Orgnaic Photochemistry and Photobiology (2nd Edition), pp. 106-1-106-20 (2004).
Stegmaier et al., "Photoresponsive Surfaces with Two Independent Wavelength Selective Functional Levels", Langmuir, vol. 24, pp. 11872-11879 (2008).
Willis, "Portraits of Life, One Molecule at a Time", Analytical Chemistry, vol. 79, pp. 1785-1788 (2007).
Zhao et al., "New Caged Coumarin Fluorophores with Extraordinary Uncaging Cross Sections Suitable for Biological Imaging Applications", J. Am. Chem. Soc., vol. 126, pp. 4653-4663 (2004).
International Search Report for PCT/EP2009/006578 dated Nov. 22, 2010.

PHOTOACTIVABLE FLUORESCENT DYES FOR OPTICAL MICROSCOPY AND IMAGING TECHNIQUES

BACKGROUND OF THE INVENTION

Masked (or "caged") fluorescent dyes initially exist in a non-fluorescent form, which may be transformed into the fluorescent state ("uncaged") by an external stimulus, i.e. enzyme, light, change of the pH-value, etc. This process my be reversible or irreversible, but in most cases "uncaging" means an irreversible change in the course of which the initially colourless or only slightly yellowish substance turns to be strongly coloured and fluorescent. Light is a treasured stimulus in life sciences for several reasons. It may be applied non-invasively, at various wavelengths, with various powers, and with a very high spatial and temporal precision. Therefore, photochemically induced uncaging processes comprise an important tool-box in life sciences and biophysical chemistry. The initially invisible "caged" fluorescent dye may be randomly distributed in the studied object, or it may be used as a label, e.g. in the form of a bioconjugate which "recognizes" the target. After that, a certain dose of UV or visible light produces the coloured and fluorescent species, so that their spatial and temporal distribution may be controlled with high precision at the moment of "uncaging" and later, as the system evolves. Such "optical injections" may generate fluorescent marks not only in biological systems, but also in capillars of the microfluidic sytems [P. H. Paul, M. G. Garguilo, D. J. Rakestraw, *Anal. Chem.* 1998, 70, 2459-2467; J. I. Molho, A. E. Herr, B. P. Mosier, J. G. Santiago, T. W. Kenny, R. A. Brennen, G. Gordon, B. Mohammadi, *Anal. Chem.* 2001, 73, 1350-1360]. Imaging of the newly created fluorescent mark followed by its monitoring in time provides quantitative dynamic and structural parameters. For choosing fluorophores for caging, several parameters are important: uncaging efficiency under standard illumination conditions (diode lasers or lamps at wavelengths >375 nm), quick photoactivation (in the range of milliseconds or faster) for tracking rapid processes, high fluorescence quantum yields and photostability after uncaging, ability to penetrate into living cells (alone and after binding with "small" molecules which recognize target structures), low (photo)toxicity of the caged substances and their (decomposition) products after uncaging, high performance in water and aqueous buffers, reliable synthesis and conjugation protocols, stability of bioconjugates against hydrolysis, availability of the multicolor "toolbox" with well separated absorption and emission bands for the (co)localization and FRET studies [cf.: R. C. Willis, *Anal. Chem.* 2007, 79, 1785-1788].

Coumarines [W.-H. Li, YuRui Zhao, U.S. Pat. No. 7,304,168 (Apr. 12, 2007); YuRui Zhao, Q. Zheng, K. Dakin, K. Xu, M. Martinez, W.-H. Li, *J. Am. Chem. Soc.* 2004, 126, 4653-4663], fluorescein [a) R. P. Haugland, K. R. Gee, U.S. Pat. No. 5,635,608 (Mar. 6, 1997); b) T. Kobayashi, Y. Urano, M. Kamiya, T. Ueno, H. Kojima, T. Nagano, *J. Am. Chem. Soc.* 2007, 129, 6696-6697; c) G. A. Krafft, W. R. Sutton, R. T. Cummings, *J. Am. Chem. Soc.* 1988, 110, 301-303] and rhodamines [a) Rhodamine Q: T. J. Mitchison, K. E. Slavin, J. A. Theriot, K. Gee, A. Mallavarapu, *Methods in Enzymology* 1998, 291, 63-78; *Bioorg. Med. Chem. Lett.* 2001, 11, 2181-2183; b) Rhodamine 110: L. D. Lavis, T.-Y. Chao, R. T. Raines, *ACS Chem. Biol.* 2006, 1, 252; J. Ottl, D. Gabriel, G. Marriott, *Bioconjugate Chem.* 1998, 9, 143-151] have been disclosed and used as caged fluorescent dyes. Synthesis and properties of caged fluorescent 2-amidothioxanthones—compounds structurally similar to fluorescein or rhodamines—were also reported [J. R. R. Majjigapu, A. N. Kurchan, R. Kattani, T. P. Gustafson, A. G. Kutateladze, *J. Am. Chem. Soc.* 2005, 127, 12458-12459]. As a photocleavable unit, most of these caged compounds contain a 2-nitrobenzyl group or its derivatives with an α-substituent and/or one or two methoxy groups in the aromatic ring [U.S. Pat. No. 5,635,608]. The α-position to the phenyl ring ($CH_2$— group) may be decorated with a carboxy or an alkyl group facilitating the uncaging reaction. An example of the caged Rhodamine Q is given below. This model compound (compound 1) was synthesized by the present inventors as indicated in Scheme 1.

Scheme 1. Photolysis of the caged rhodamine Q (compound 1) with a mercury arc lamp (>360 nm) or with a diode laser (375 nm) produces the fluorescent dye and 4,5-dimethoxy-2-nitrosobenzaldehyde (2).

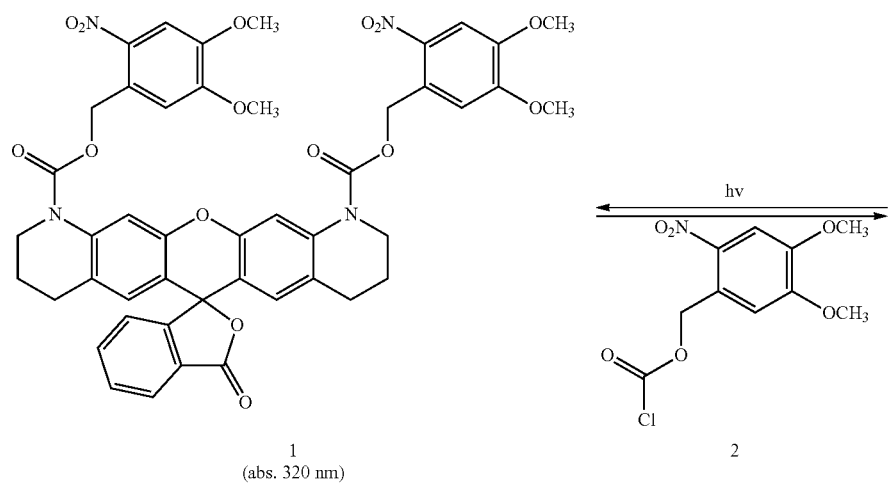

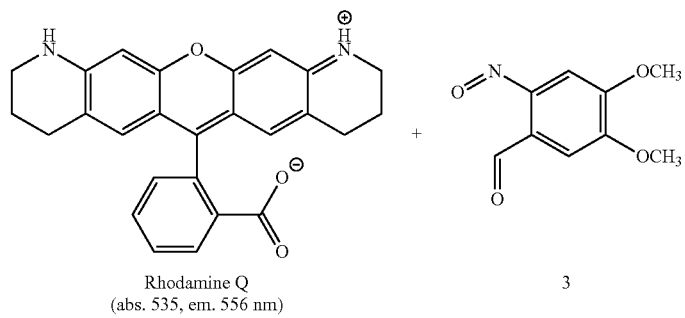

Rhodamine Q
(abs. 535, em. 556 nm)

Methoxy groups in combination with a nitro group in the aromatic ring provide the required absorption in the near UV region and also speed-up the liberation of an uncaged fluorescent dye. Without them the removal of 2-nitrobenzyl group is very slow and requires hard UV light incompatible with living cells. Acylation of both nitrogen atoms in rhodamine Q with commercially available compound 2 affords the yellow compound 1 with a Spiro junction of the xanthene fragment and the aromatic lactone ring. In this non-fluorescent compound the extended π-conjugation is broken, and therefore the deep red colour of rhodamine Q disappeared. Practical applications (e.g. bioconjugation) require compounds with a free second carboxy group or other functionality in the disubstituted "lower" benzene ring. However, the synthesis of all caged rhodamines with such a second carboxy group is difficult and low-yielding [T. J. Mitchison, K. E. Slavin, J. A. Theriot, K. Gee, A. Mallavarapu, Methods in Enzymology 1998, 291, 63-78]. Probably because of that they did not find any widespread use.

A big disadvantage of 2-nitrobenzyl group and its substitutes is that upon photolysis they produce colored and highly reactive 2-nitrosobenzaldehyde or 2-nitrosobenzophenone. All aromatic nitroso compounds including 2-nitrosobenzaldehyde, 2-nitrosobenzophenone and their derivatives are known to be toxic. Acute toxicity of these compounds may unfavourably influence the normal cell life, and even cause cell death. The chemical reactivity of 2-nitrosobenzaldehyde or 2-nitrosobenzophenone is very high; they react with amino groups in proteins giving Schiff's bases (imines) which form oligomers, especially under irradiation with UV-light. The dark colour of these oligomeric by-products may interfere with optical measurements; they may act as a sort of undesired optical filter. The amount of these by-products and oligomers could be reduced, if it were possible to use the monoacylated rhodamine derivatives. Unfortunately, they are still fluorescent (though they absorb and emit at shorter wavelengths than the free dye). An urgent need for other caging groups free from the drawbacks mentioned above stimulates the on-going research. However, other modern caging groups which absorb in the near UV region are also bulky, and the procedures of their synthesis, caging and uncaging reactions may be rather complicated. For example, N,N-dimethyl-2-hydroxy-4-nitrophenol was reported to give photocleavable phenyl esters [A. Banerjee, C. Grewer, L. Ramakrishnan, J. Jäger, A. Gameiro, H.-G. A. Breitinger, K. R. Gee, B. K. Carpenter, G. P. Hess, J. Org. Chem. 2003, 68, 8361-8367; cf.: M. Matsuzaki, G. C. R. Ellis-Davies, T. Nemoto, Y. Miyashita, Y. Iino, H. Kasai, Nature Neurosci. 2001, 4, 1086-1092]. Another heterocycle-7-diethylamino-4-(hydroxymethyl)-2H-chromen-2-one—is known to form esters which may easily be cleaved by irradiation at 412 nm [P. Stegmaier, J. M. Alonso, A. Del Campo, Langmuir 2008, 24, 11872-11879]. Yet other heterocycles—derivatives of 8-bromo-7-hydroxyquinoline [O. D. Fedoryak, T. M. Dore, Org. Lett. 2002, 4, 3419-3422] and 6-bromo-7-hydroxycoumarines [T. Furuta, S. S.-H. Wang, J. L. Dantzker, T. M. Dore, W. J. Bybee, E. M. Callaway, W. Denk, R. Y. Tsien, Proc. Natl. Acad. Sci. USA 1999, 96, 1193-2000; H. Ando, T. Furuta, R. Y. Tsien, H. Okamoto, Nat. Genet. 2001, 28, 317-325; W. Lin, D. S. Lawrence, J. Org. Chem. 2002, 67, 2723-2726; H. J. Montgomery, B. Perdicakis, D. Fishlock, G. A. Lajoie, E. Jervis, J. G. Guilemette, Bioorg. Med. Chem. 2002, 10, 1919-1927]—have also been proposed as photocleavable protecting groups. All of these groups provide the required absorption in the near UV or violet spectral region and may be cleaved off by photoirradiation. The general disadvantage of all bulky caging groups is that their big size and limited solubility in water considerably reduce the cell permeability of the whole assemblies with fluorescent dyes. Further conjugation with small molecules is sometimes required for selective binding with the biological targets. These additional structural fragments further increase the molecular dimensions and may retard or even inhibit the penetration of the whole photoactivable adducts through cell walls and biomembranes precluding their successful use in biological microscopy.

Consequently, the main object of the present invention was to provide novel photoactivable fluorescent dyes incorporating small photoactive groups with improved properties such as the capability for easy and effective photoactivation (uncaging) which does not generate toxic substances which may interfere with biochemical processes in cells or tissues.

A related object was to provide novel reagents and methods for bioconjugation and various imaging techniques, including those which provide optical single molecule switching (SMS) "nanoscopy" (diffraction unlimited optical resolution by using switching of the fluorescence of the single molecules).

These objectives have been achieved by providing the novel photoactivable compounds according to claims 1-3, the methods of preparation according to claims 4-5 and the uses of claims 6-19.

DESCRIPTION OF THE INVENTION

The novel photoactivable compounds according to claim 1 are photoactivable rhodamine or carbopyronine derivatives of the following general formulae G1-G4 comprising UV light absorbing chromophores which after photolysis by irradiation at 254-490 nm (preferably at 375-420 nm) generate fluorescent rhodamine or carbopyronine derivatives and small non-toxic fragments such as $N_2$ or $N_2O$.

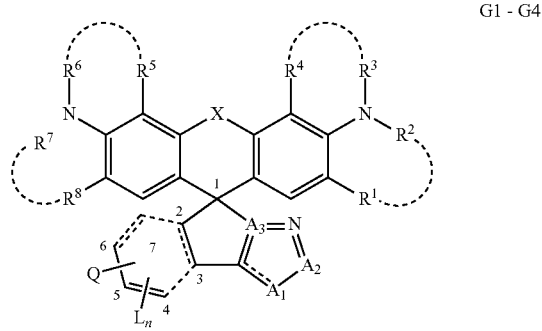

G1: A1=O, A2=N, A3=C;

G2: A1=S, A2=N, A3=C;

G3: A1=O, A2=O, A3=N;

G4: A1=S, A2=O, A3=N;

wherein $R^1$, $R^2$, ($R^1$-$R^2$), $R^3$, $R^4$, ($R^3$-$R^4$) $R^5$, $R^6$, ($R^5$-$R^6$), $R^7$, $R^8$, ($R^7$-$R^8$)=H, unsubstituted or substituted alkyl(cycloalkyl), unsubstituted or substituted cycloalkenyl, unsubstituted or substituted heterocylic residue, unsubstituted or substituted aryl, unsubstituted or substituted hetaryl; and X=O, S, C(CH$_2$)$_2$;

the chemical bond between C-2 and C-3 may be a single or double bond (more specifically a cis-C(Q=C(L)-bond);

alternatively, C-2 and C-3 may be a part of any cyclic system, preferably the benzene ring;

and the substituents Q and/or L are independently defined as follows (n=0, 1, 2, 3 or 4): H, COOR$^9$, COCH=N=N, CH$_2$COOR$^9$, N(R$^1$ ... R$^2$), NR$^{10}$R$^{11}$, SR$^{12}$, F, Cl;

wherein R$^9$=H, unsubstituted or substituted alkyl, cycloalkyl, or heterocyclic residue, N-succinimidyl, N-sulfosuccinimidyl, unsubstituted or substituted phenyl, aryl or hetaryl; R$^{10}$, R$^{11}$=C=S, C=O; R$^{12}$=H, (CH$_2$)$_m$COOR$^9$ (m=1-11), unsubstituted or substituted alkyl, cycloalkyl, heterocyclic residue, aryl or hetaryl.

In a preferred embodiment of the present invention, the novel photoactivable compounds of the invention are represented by the general structural formulae I, II and III below Scheme 2. Photoactivable 9H-xanthene (X = O) or 9,10-dihydroanthracene (X = CMe$_2$) derivatives with spiro 2-diazoketone (I), 1,2,3-thiadiazole (II), and N-nitroso(thio)amide (III) fragments; wherein R$^1$, R$^2$, (R$^1$—R$^2$), R$^3$, R$^4$, (R$^3$—R$^4$), R$^5$, R$^6$, (R$^5$—R$^6$), R$^7$, R$^8$, (R$^7$—R$^8$) = H, unsubstituted or substituted alkyl (cycloalkyl), unsubstituted or substituted cycloalkenyl, unsubstituted or substituted heterocylic residue, unsubstituted or substituted aryl, unsubstituted or substituted hetaryl; and X = O, S, C(CH$_3$)$_2$; Y = COOR$^9$, COCH=N=N, CH$_2$COOR$^9$, N(R$^1$---R$^2$), NR$^{10}$R$^{11}$, SR$^{12}$, F, Cl; Z = H, F, Cl; W = O, S; R$^9$ = H, unsubstituted or substituted alkyl, cycloalkyl, or heterocyclic residue, N-succinimidyl, N-sulfosuccinimidyl, unsubstituted or substituted phenyl, aryl or hetaryl; R$^{10}$, R$^{11}$ = C=S, C=O, R$^{12}$ = H, (CH$_2$)$_m$COOR$^9$ (m = 1 - 11), unsubstituted or substituted alkyl, cycloalkyl, heterocyclic residue, aryl or hetaryl.

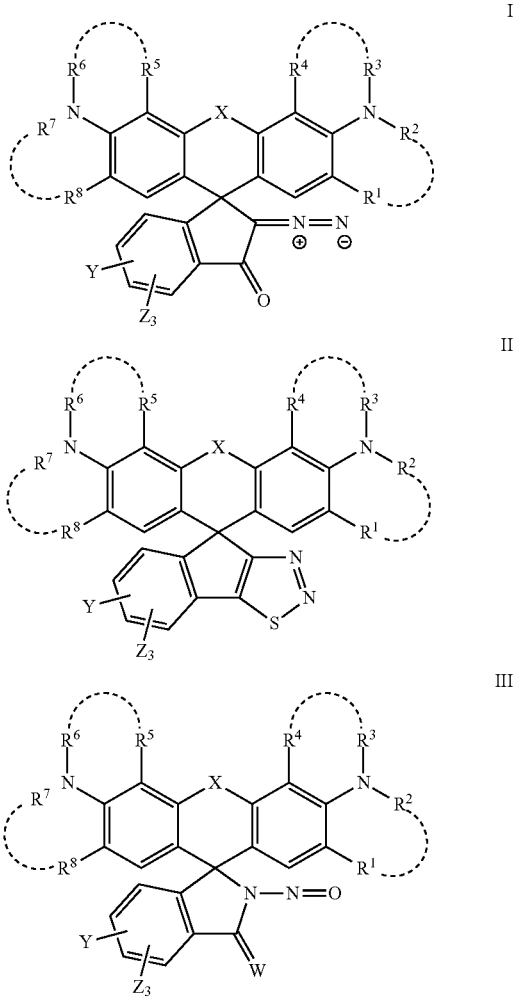

The term "heterocyclic residue", as used herein, refers to an unsubstituted or substituted mono-, bi-, tri- or polycyclic ring system incorporating the groups R$^1$-R$^2$ and/or R$^3$-R$^4$ and/or R$^5$-R$^6$ and/or R$^7$-R$^8$ fused with the 3,6-diamino spiro-9H-xanthene or 9,10-dihydroanthracene fragment in such a way that these groups R$^1$ and R$^2$, (and/or R$^3$ and R$^4$, R$^5$ and R$^6$, R$^7$ and R$^8$) are bound with each other directly or through any additional bridge (linker), which may contain or may not contain any additional heteroatom (e.g. Si, N, O, P, S, Se, etc.).

The term "aryl", as used herein, refers to an unsubstituted or substituted mono-, bi- or tricyclic carbocyclic ring system having one, two or three aromatic rings including but not limited to phenyl, naphthyl, anthryl, azulyl, tetrahydronaphthyl, indanyl and indenyl.

The term "hetaryl", as used herein, refers to an unsubstituted or substituted cyclic aromatic radical having from 5 to 10 ring atoms of which at least one ring atom is selected from S, O and N; the radical being joined to the rest of the molecule via any of the ring atoms. Representative, but not limiting examples are pyridinyl, pyrazinyl, pyrimidinyl, pyrrolyl, imidazolyl, thiazolyl, oxazolyl, isooxazolyl, thiadiazolyl, oxadiazolyl, thiophenyl, furanyl, quinolinyl and isoquinolinyl.

The terms "alkyl" or "cycloalkyl", as used herein, comprise any unsubstituted or substituted (cyclo)alkyl groups. Specific, but not limiting examples are an unsubstituted or substituted methyl group, ethyl group, lower (cyclo)alkyl group with 3-10 C atoms, or (cyclo)alkyl group with 11-30 or more C atoms.

The term "cycloalkenyl", as used herein, comprises any unsubstituted or substituted cycloalkenyl groups. Specific, but not limiting examples are unsubstituted or substituted lower cycloalkenyl groups with 3-10 C atoms, or cycloalkenyl groups with 11-30 or more C atoms.

All compounds of formulae I-III comprise the basic rhodamine or carbopyronine scaffolds and have smaller functional groups (chromophores) absorbing UV light.

Compounds with general formula I contain a 2-diazoketone α-diazoketone) fragment, compounds II possess the 1,2,3-thiadiazole heterocycle, and compounds III an N-nitroso (thio)amide moiety. These residues all consist of only 5 atoms and are photochemically active. Compounds I-III are yellow solids and their solutions are non fluorescent. Photolysis at 254-490 nm (preferably at 375-420 nm) generates highly coloured and fluorescent products—derivatives of rhodamine (X=O) or carbopyronine (X=CMe$_2$) dyes.

A further aspect of the invention relates to various advantageous uses of the claimed compounds, in particular of the structural formulae I-III. Due to their favourable characteristics, these compounds represent efficient fluorescent dyes and markers.

The claimed compounds can easily be photoactivated (uncaged) with UV-light (preferably at 375-420 nm). Photodecomposition (uncaging) generates the coloured and highly fluorescent derivatives of rhodamine or carbopyronine fluorescent dyes. The new photoactivable compounds penetrate into the living cells. Irradiation of these compounds is accompanied with elimination of small stable molecules—nitrogen and nitrogen(I) oxide. The uncaging reaction does not generate any toxic substances which may interfere with biochemical processes in cells or tissues. The new caged fluorescent dyes may be coupled with antibodies and used in immunolabelling experiments followed by photoactivation in aqueous (cell culture) media. Uncaging protocols may be implemented with common fluorescent microscopes, optics with high numerical apertures and light sources (diode lasers and lamps). Gradual photoactivation using light with low intensities is also possible. Rapid switching within 1-3 ms allows the tracking of fast processes in cells, thin capillaries, etc. The new masked fluorescent dyes may be used as markers in imaging techniques and other applications where spatial and temporal resolution is essential (e.g. for protein tracking, in microfluidic devices, labs on the chip, etc.). The photoactivable fluorescent dyes of the present invention may be also used in the newly emerged nanoscopic techniques, in which uncaging of single molecules followed by acquisition of the emitted photons and application of various localization protocols allows an image restoration with an optical resolution of ca. 50 nm.

The novel photactivable compounds can be readily coupled to other molecules, in particular biomolecules such as peptides, proteins, lipids, carbohydrates, nucleic acids, or toxins, and the resulting bioconjugates can be used as fluorescent dyes or markers as well.

Thus, the present invention provides the use of compounds according to any one of claims 1-3 as reagents for conjugation or bioconjugation. The conjugation or bioconjugation (conjugation with a biomolecule, e.g. a type of molecule which is present in a (living) cell or an organism, including a microorganism or virus) comprises formation of at least one covalent chemical bond or at least one molecular complex with any chemical entity, substance or object, e.g., amine, carboxylic acid, aldehyde, alcohol, aromatic compound, heterocycle (e.g. biotin), dye, amino acid, amino acid residue coupled to any chemical entity, peptide, protein (e.g. avidin, streptavidin), carbohydrate, nucleic acid, toxin, lipid, enzyme, antibody, etc.

In a more specific embodiment the conjugation comprises the formation of two or more covalent chemical bonds and/or molecular complexes with any chemical entities, substances or objects, e.g., amines, carboxylic acids, aldehydes, alcohols, aromatic compounds, heterocycles (biotin), dyes, amino acids, peptides, proteins (e.g. avidin, streptavidin), carbohydrates, nucleic acids, toxins, lipids, enzymes, antibodies, etc. and the reagents may be cross-linking agents.

The use of said compounds for conjugation or cross-linking may be in solution, as colloids or solids.

In a preferred specific embodiment, compounds 22-NHS, 23-NHS, and 30 with two functional groups are used as (cross)linking reagents.

A specific use of the compounds according to claims 1-3 or of their conjugates comprises the use for bioconjugation with (secondary) antibodies and immunolabelling/immunostaining.

The present invention also provides the use of the compounds of formulae G1-G4 or I-III as such or after photoactivation or of their conjugates with biomolecules or any other chemical entity, substance or object, e.g., amine, carboxylic acid, aldehyde, alcohol, aromatic compound, heterocycle (biotin), dye, amino acid, amino acid residue, peptide, a protein such as e.g. avidin, streptavidin, an enzyme, antibody, a carbohydrate, toxin, lipid, a nucleic acid such as DNA, RNA or a fragment or derivative thereof including an (oligo)nucleotide or (oligo)nucleoside, etc., as (fluorescent) dyes or labels.

In this use, the compounds in claims 1-3 or their conjugates may be transformed from the caged (masked) non-fluorescent structure to the fluorescent form (uncaged) by UV or visible light which causes a certain chemical reaction to occur, namely the elimination of molecular nitrogen ($N_2$) or nitrogen(I) oxide ($N_2O$). Photoactivation (uncaging) of the claimed compounds is performed in solution (water, aqueous buffers, organic solvents and their mixtures), in a solid state, in colloids and polymer matrices. Complete photoactivation within 1 ms-1 s is feasible. Gradual or step-wise photoactivation is possible with low light intensities. Preferably, starting (caged) compounds are colorless or yellow and possess the long-wave absorption band with a maximum at 250-450 nm and may be uncaged (activated) with diode lasers irradiating at 375 nm or lamps at wavelengths 250-500 nm.

Specifically, the present invention provides the use of the compounds of formulae G1-G4 or I-III as such or after photoactivation or of their conjugates as dyes and/or labels in the fields of optical microscopy and imaging techniques, microfluidic devices, capillary electrophoresis, protein tracking techniques. More specifically, the optical microscopy and imaging techniques comprise stimulated emission depletion microscopy [STED], single molecule switching (SMS) "nanoscopy" (diffraction unlimited optical resolution by using switching of the fluorescence of the single molecules: e.g. single molecule localization microscopy [SMLM], photoactivation localization microscopy [PALM, PALMIRA, fPALM], stochastic optical reconstruction microscopy [STORM]), fluorescence correlation spectroscopy [FCS], fluorescence recovery after photobleaching [FRAP], fluorescence lifetime imaging [FLIM], ground state depletion with individual molecular return [GSDIM], and fluorescence resonant energy transfer [FRET], but are not limited thereto.

Further, the present invention also provides the use of the compounds according to any one of claims 1-3 or of their conjugates as cell permeable substances penetrating through membranes of living and fixed cells in the caged non-fluorescent form which may be later photoactivated (uncaged) inside a living or fixed cell.

In a still further embodiment, the present invention provides the use of the compounds according to any one of claims 1-3 or of their conjugates as such or after photoactivation for tracking and monitoring dynamic processes in a sample or in an object. Typically, in this embodiment changes in the shape, dimensions and/or the intensity of the fluorescence signal obtained after photoactivation of the compounds according to any one of claims 1-3 or of their conjugates will correspond to a change or evolution of the sample or object in study or of its environment, e.g. protein tracking, flow of a liquid, etc.

A further specific embodiment relates to the use of the compounds according to any one of claims 1-3 or of their conjugates as such or after photoactivation as labels specific for mitochondria. In particular, compounds 22-H, 22-NHS, 23-H, and 23-NHS may be advantageously used as labels specific for mitochondria.

A still further specific embodiment relates to the use of the claimed compounds, in particular of compounds 22-H, 22-NHS, 23-H and 23-NH in single molecule switching (SMS) nanoscopy. The use of such compounds drastically improves the optical resolution and provides diffraction-unlimited imaging (e.g. with an optical resolution better than 100 nm).

In a further aspect, the present invention also provides methods for producing compounds of the general formulae I-III.

In a specific embodiment, the following method consisting of steps a), b) and c) for preparing compounds I and II according to claim 2, is provided:

a) converting the spiro-9H-xanthene or 9,10-dihydro-anthracene starting compound 4-X as depicted in the following scheme (or their synthetically equivalent open forms having a free carboxylic group) into the corresponding acid halide 5-X;
b) reacting compound 5-X with a diazomethane compound to produce the diazoketone I;
c) optionally reacting compound I with a thionating agent to produce the 1,2,3-thiadiazole derivative II.

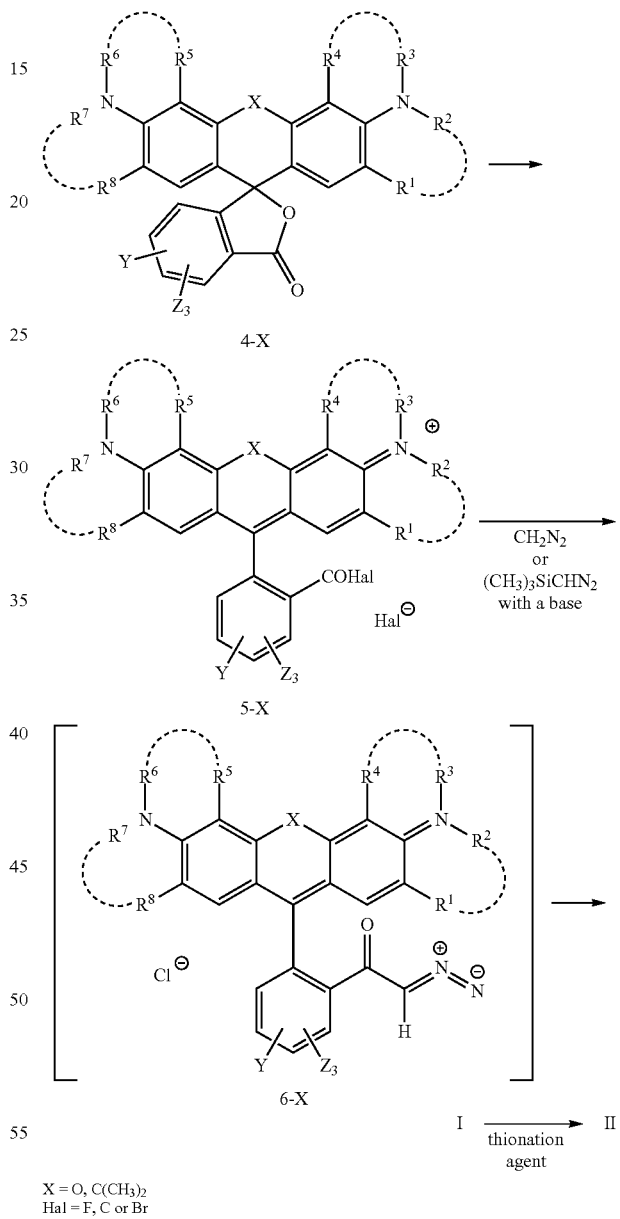

As a further specific embodiment, the following method for preparing compounds III according to claim 2, comprising the steps a), b) and c), is disclosed:
a) converting the acid halide 5-X or alkyl ester 8-X as depicted in the following scheme into the amide 7-X;
b) reacting compound 7-X with a thionation agent to produce the corresponding thioamide 9-X;

c) deprotonation of the amide 7-X or thioamide 9-X with a strong base followed by the reaction with a nitrosation agent.

super strong (phosphasene) organic bases, etc.) followed by the reaction with a nitrosation agent (e.g. NOCl or NO(+)*BF$_4$(−)).

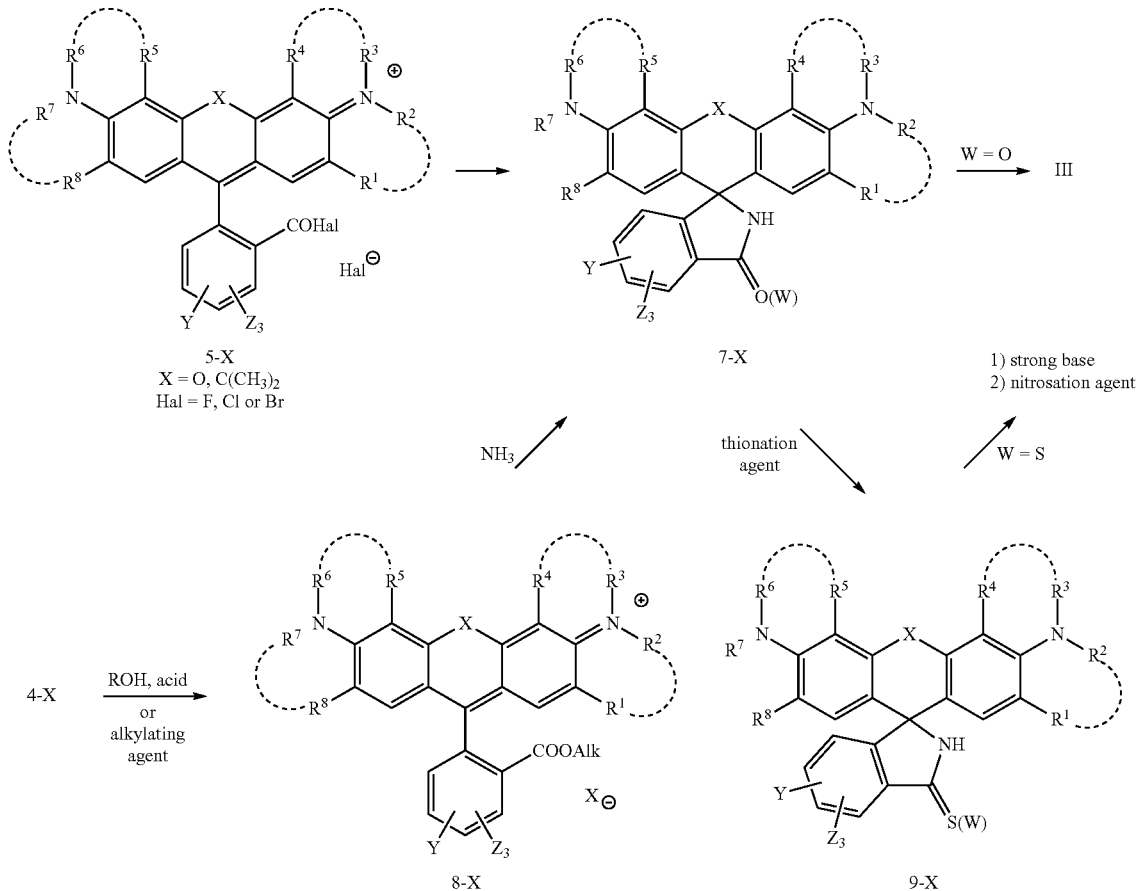

In a more specific embodiment, there is provided a method for preparing compounds I and II according to claim 2, comprising the steps:
a) converting the spiro-9H-xanthene or 9,10-dihydro-anthracene starting compound 4-X of scheme 3 (or their synthetically equivalent open forms having a free carboxylic group) into the corresponding acid chloride 5-X;
b) reacting compound 5-X with a diazomethane compound (represented by diazomethane or trimethylsilyldiazomethane) to produce the diazoketone I;
c) optionally reacting compound I with a thionating agent (e.g. Lawesson reagent or P$_4$S$_{10}$) to produce the 1,2,3-thiadiazole derivative II.

In another more specific embodiment, the present invention provides a method for preparing compounds III according to claim 2, comprising the steps:
a) converting the acid chloride 5-X or the methyl ester 8-X of scheme 4 into the amide 7-X;
b) reacting compound 7-X with a thionation agent (e.g. Lawesson reagent or P$_4$S$_{10}$) to produce the corresponding thioamide 9-X;
c) deprotonation of the amide 7-X or thioamide 9-X with a very strong base (e.g. tBuOK, NaN(SiMe$_3$)$_2$, NaH, KH, General Synthesis of the Novel Photoactivable Compounds of the Invention Synthetic routes to the new photoactivable compounds are given in Schemes 3-10. Rhodamines and carbopyronines are convenient starting materials for the synthesis of the spiro-compounds I-III (Schemes 3, 4).

Scheme 3. General approach to spiro 2-diazoketones (I) and 1,2,3-thiadiazoles (II):

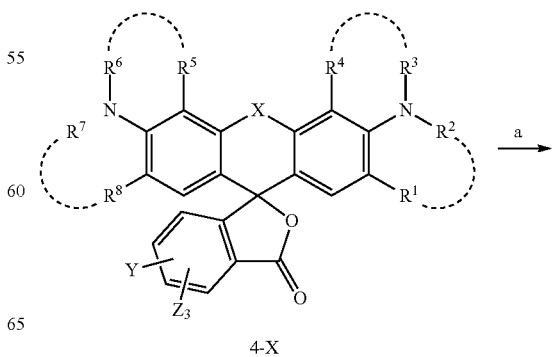

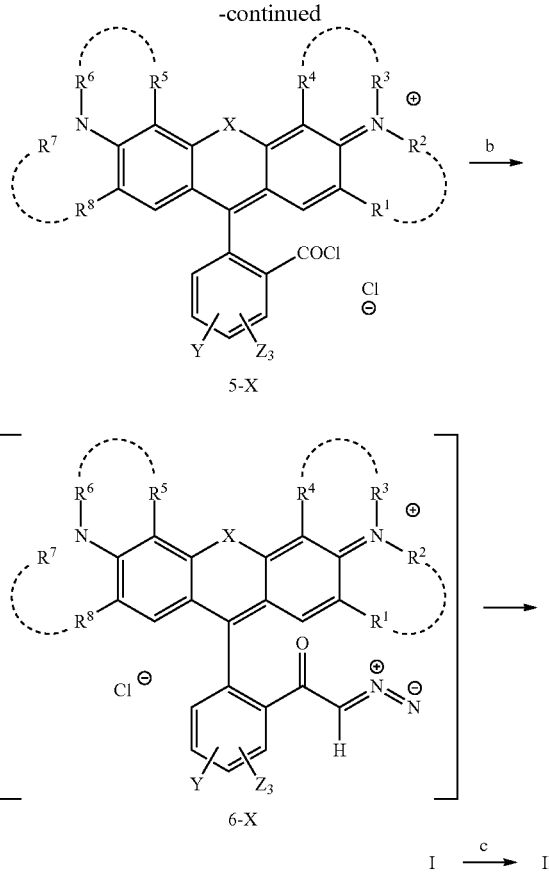

5-X

6-X

I $\xrightarrow{c}$ II a) (COCl)$_2$, CH$_2$Cl$_2$, room temp., 2-4 h or POCl$_3$ in 1,2-dichloroethane, reflux, 4 h; b) CH$_2$N$_2$ or 2M Me$_3$SiCHN$_2$ in Et$_2$O with Et$_3$N, THF; c) Lawesson reagent, benzene (toluene) or THF, heating.

Activation of the free carboxylate in compound 4-X (Scheme 3) with oxalyl chloride or, for the less reactive substrates, by heating with POCl$_3$ produces the corresponding acid chloride 5-X. Careful removal of an excess of the reagent followed by the reaction of the acid chloride 5-X with a solution of diazomethane or commercially available trimethylsilyl diazomethane in ether, directly affords the yellowish and non-fluorescent closed form of an α-diazoketone I. Obviously the proton in the CH=N=N group is acidic enough, and, after abstraction of HCl, the open form of diazoketone 6-X cyclises into the more stable closed isomer I. Analogous reaction of the primary rhodamine amides is known and affords the colourless ring-closed isomers.

α-Benzoyl diazoalkanes have an absorption band with a maximum at about 320 nm and ε~12000. Photolysis of α-diazoketones is accompanied by elimination of nitrogen, and the intermediately formed carbene participates in Wolff rearrangement. It forms the corresponding ketene which is then trapped by any nucleophile available in the reaction medium (water, amine, alcohol, etc.). These transformations result in the elongation of the carbon chain and have been studied in detail [W. Kirmse, *Eur. J. Org. Chem.* 2002, 2193-2256]. The relevant examples will be given below. Interestingly, photolysis of diazoketone has been used in bioconjugation for cross-linking of the amine containing compounds [G. T. Hermanson *Bioconjugate techniques* (Academic Press, Elsevier) 1996, 272-274].

α-Diazo carbonyl compounds may be used as starting materials for other photoreactive substances—1,2,3-thiadiazole derivatives II [M. I. Levinson, M. P. Cava, *Heterocycles,* 1984, 19, 241-243]. The latter easily undergo photodegradation forming highly reactive thioketenes [P. Krauss, K.-P. Zeller, H. Meier, E. Müller, *Tetrahedron* 1971, 27, 5953-5957], which also add nucleophiles.

Another novel small photoactivable group incorporated into the rhodamine or carbopyronine fluorophore is the N-nitrosothioamide group (Scheme 4). Thioamides are known to absorb weakly in the near UV-region [Photochemistry of thioamides and thioimides have been reviewed: a) M. Sakamoto, T. Nishio in: *CRC handbook of Organic Photochemistry and Photobiology* (2$^{nd}$ Ed.) (Ed.: W. Horspool, F. Lenci), CRC Press LLC, Boca Raton, 2004, pp. 106/1-106/20; b) T. Nishio, M. Sakamoto, *Rev. Heteroatom Chem.* 1995, 12, 23-52]. Thioamides of rhodamines (without N-nitroso group) are known. Primary rhodamine thioamides are known exist in the closed form. For the synthesis of the compound class III, it is necessary to prepare the simplest thioamides 9-X as starting materials (Scheme 4).

Scheme 4. General approach to spiro N-nitroso (thio) amides (III):

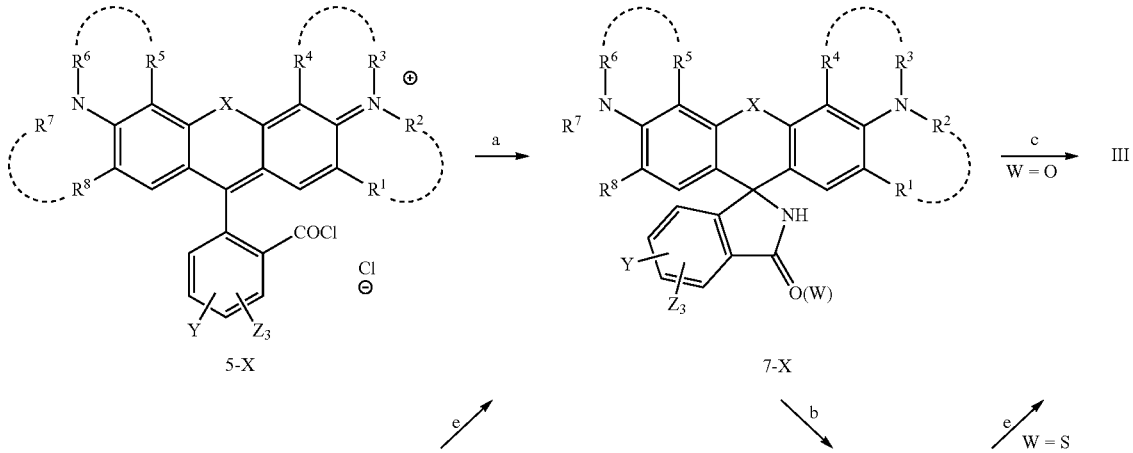

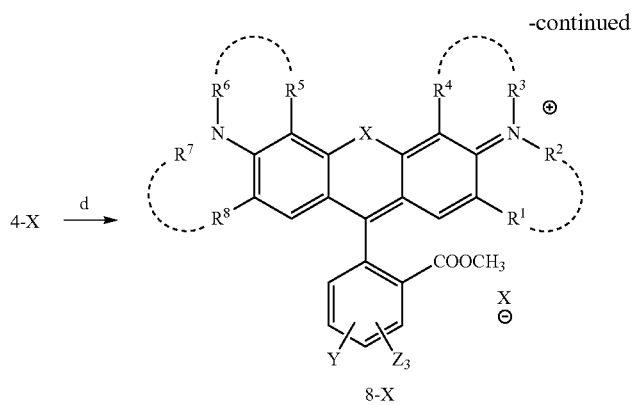

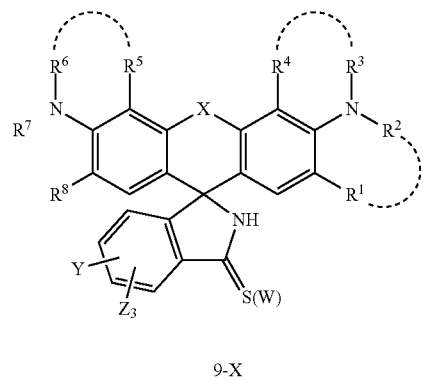

8-X

9-X a) aq. or alcoholic NH$_3$, MeCN, room temp.; b) Lawesson reagent, benzene (toluene), heating; c) strong base, then NOCl or NO(+)*BF$_4$(-); d) MeOH, mineral acid, heating; e) aq. or alcoholic NH$_3$, heating.

The latter are easily available via two routes which involve either the corresponding acid chlorides 5-X, or methyl esters 8-X. Acid chlorides 5-X are very reactive, and the simplest amides 7-X may be obtained from them under very mild conditions. Methyl esters 8-X can also be transformed into the required amides 7-X, but this transformation is feasible only under the harsh conditions: heating with concentrated alcoholic or aqueous ammonia in an autoclave is normally required to complete the amidation reaction. Amides 7-X may easily be transformed into the corresponding thioamides 9-X using the Lawesson reagent (or P$_2$S$_5$ in pyridine). After deprotonation with commercially available very strong bases (e.g. tBuOK, NaN(SiMe$_3$)$_2$, NaH, KH, phosphasene organic bases, etc.), amides 7-X or thioamides 9-X may undergo N-nitrosation with e.g. nitrosyl chloride (NOCl) or NO(+)*BF$_4$(-). Photodecomposition of N-nitroso(thio)amides III is accompanied by elimination of nitrogen(I) oxide (N$_2$O), and the intermediately formed highly reactive thioketenes may add nucleophiles and rearrange to colored and fluorescent products.

Important limitations associated with these synthetic routes follow from the use of the acid chlorides 5-X or the nitrosation agents mentioned above. Acid chlorides may acylate the primary and secondary amino groups in rhodamines and carbopyronines. Similarly, nitrosyl chloride or NO(+)*BF$_4$(-) in the presence of a base may react with these primary and secondary amino groups, too. The primary amino groups and NOCl give the corresponding (unstable) diazonium salts, and the secondary amino groups under these conditions produce N-nitroso amines. Therefore, both amino groups in the starting rhodamines 4-O or carbopyronines 4-CMe$_2$ should be fully substituted. Moreover, to avoid C-nitrosation into the ortho-position to the N,N-dialkylamino groups, (thio)amides 7-X (9-X) should be deprotonated (at the nitrogen atom) prior to the exposure to the nitrosation agent. For the same reason, nitrosation with HNO$_2$ under acidic conditions should be avoided, as it is expected to give C-nitroso derivatives.

An important feature of the present invention is that it is based on the new class of 2-diazoketones or their analogues incorporated into the skeleton of fluorescent dyes. The new transformation which was difficult to predict and which provided new useful properties is the spontaneous ring-closing reaction of the intermediates 6-X into compounds I. The cell permeability of the compact Spiro compounds I-III before photoactivation is expected to be better than that of the corresponding uncaged fluorescent dyes. The reason for this is that the initial substance is neutral and bears no electrical charges, but after elimination of N$_2$ or N$_2$O the zwitterionic form of the fluorescent dye forms, which is known to cross the membrane much more reluctantly than the corresponding "closed" (lactone) isomer of the same dye.

Rhodamine B is an inexpensive model compound for developing the synthetic routes to compound classes I-III. The feasibility of the synthesis of benzoyl diazoalkanes I is illustrated by Scheme 5. N,N,N',N'-Tetramethylrhodamine (TMR) reacts quite similarly and affords the corresponding diazoketone in high yield.

Scheme 5. Conversion of Rhodamine B into the spiro diazoketone 10: a) POCl$_3$ in 1,2-dichloroethane, reflux, 4h; b) CH$_2$N$_2$ in THF, 0° C. - room temp., 12. h.

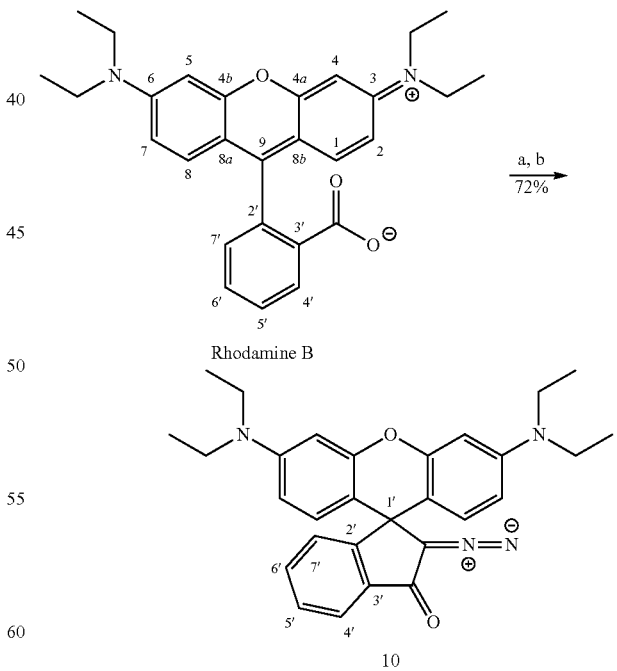

Diazoketone 10 was subjected to photolysis in methanol in order to study the product distribution. Light with wavelengths >320 nm was used. The result of this experiment is presented in Scheme 6.

Scheme 6. Photolysis of diazoketone 10 in methanol.

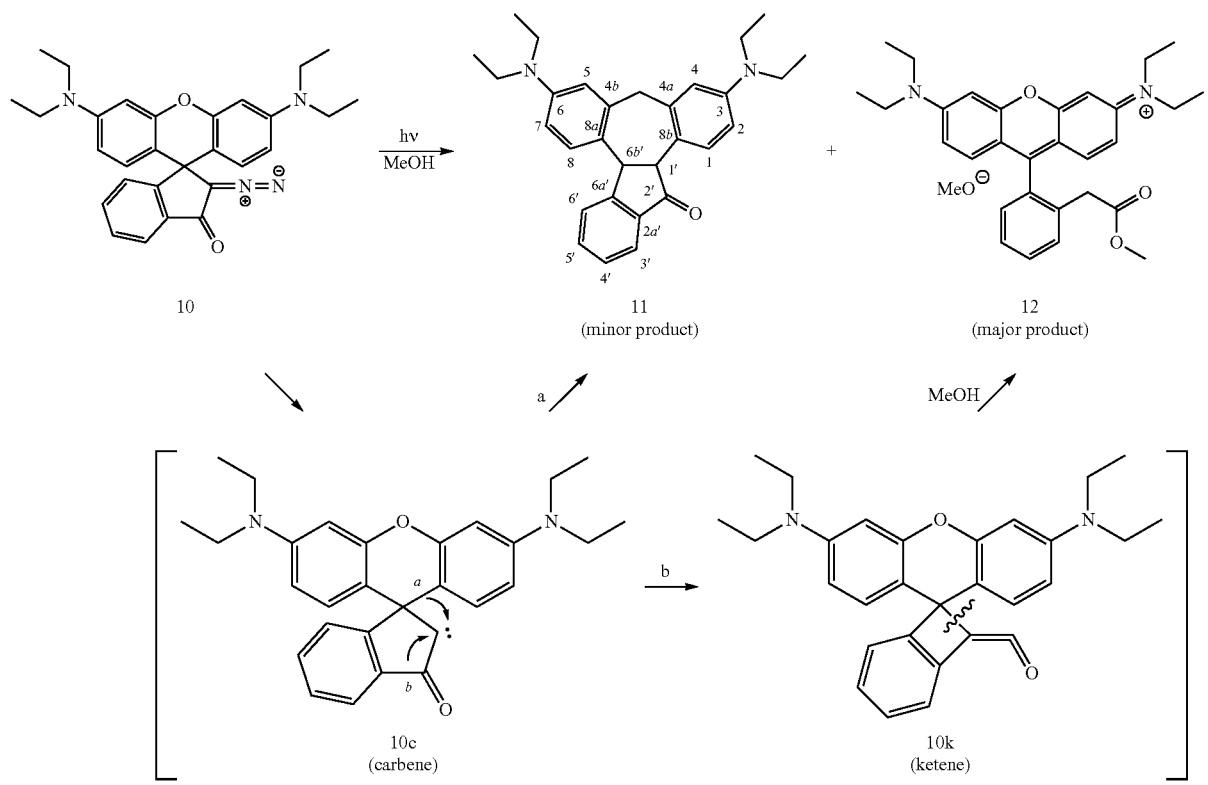

After switching on the lamp, the 1 mM solution of compound 10 immediately starts to become red, and after 40 min no starting material could be detected in the reaction mixture. Two products have been isolated. Formation of the minor non-fluorescent product 11 may be explained by migration of the bond "a" in the intermediately formed carbene 10C. The major red and fluorescent product 12 was formed in the course of Wolff rearrangement of carbene 10C to ketene 10K followed by addition of methanol to the highly reactive ketene group and breaking of the chemical bond with quaternary carbon atom. These results indicate that compounds of the general formula I may be effectively "uncaged", and their photolysis affords fluorescent rhodamine derivatives (e.g. compound 12).

Scheme 7. Conversion of 6-carboxy tetramethylrhodamine 15 into bis(diazoketone) 17: a) 85% aq. $H_3PO_4$, 170° C., 6h; b) $POCl_3$ in 1,2-dichloroethane, reflux, 4 h; $CH_2N_2$ in THF, 0° C. - room temp., 18 h; c) MeOH, $CH_2Cl_2$, $PhCO_2Ag$ (cat.), $Et_3N$ room temp., 8 h.

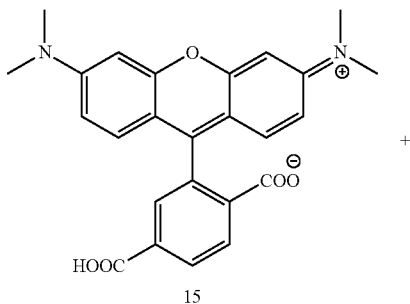

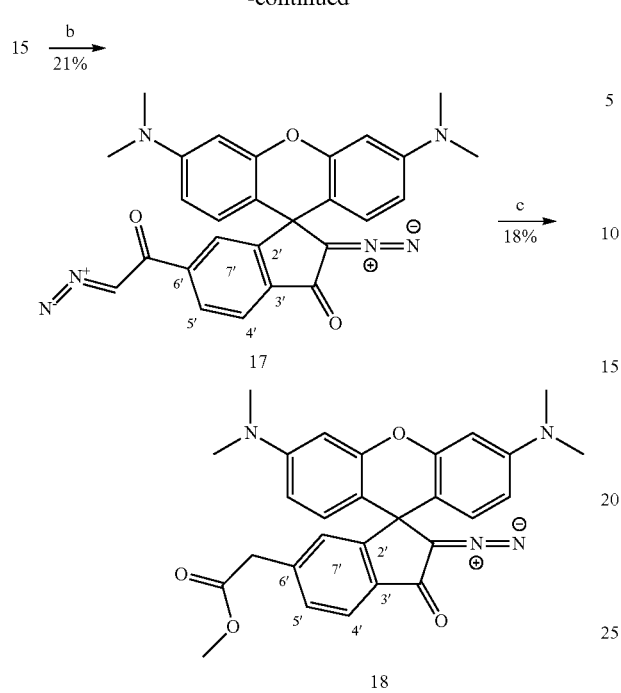
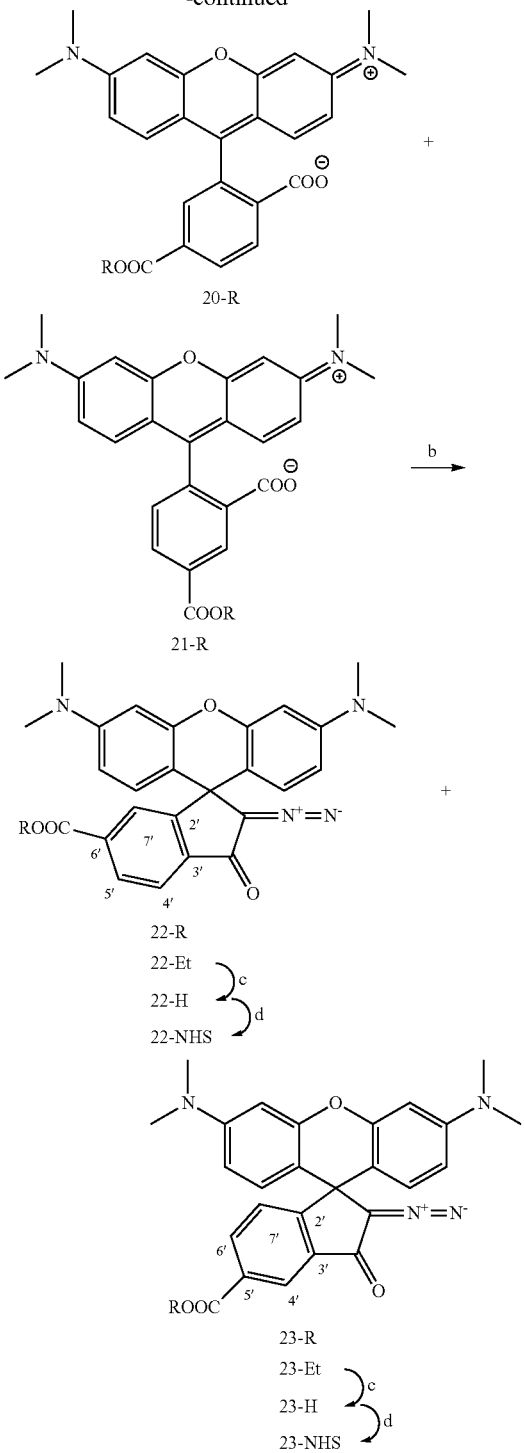

Practical use of the caged compounds I in bioconjugation procedures require the reagents with an additional functional group which may further be transformed into the amino or thiol reactive site. To provide compounds with an additional functional group in the benzoyl fragment, 5- and 6-carboxy tetramethylrhodamines (TMR) were used as starting materials (Scheme 7). Separation of a mixture of 5- and 6-carboxy TMR afforded the 6-carboxy derivative which was converted into the bis(diazoketone) 17. Catalytic reaction in methanol in the presence of silver benzoate afforded mono diazoketone 18 with the intact caged fluorophore. Thus, it was possible selectively to transform one diazoketone group into the methyl ester, from which the corresponding N-hydroxysuccimidyl ester could easily be prepared according well-established protocols. Unfortunately, the overall yield of the ester 18 was low, and therefore it was necessary to improve the approach to the caged compounds I with an additional carboxy group.

Scheme 8. Preparation of the monesters of 5(6)-carboxy tetramethylrhodamine and their conversion into diazoketones 22-R and 23-R: a) 1,2-dichlorobenzene, 170-190° C., 19 h; b) (COCl)$_2$ in CH$_2$Cl$_2$, room temp., 2-4 h; 2M Me$_3$SiCHN$_2$ in ether, CH$_2$Cl$_2$, Et$_3$N, 0° C. - room temp., 16 h; d) N,N,N′,N′-tetramethyl-O-(N-succinimidyl)isourea tetrafluoroborate, DMF, iPr$_2$NEt, room temp., 2h.

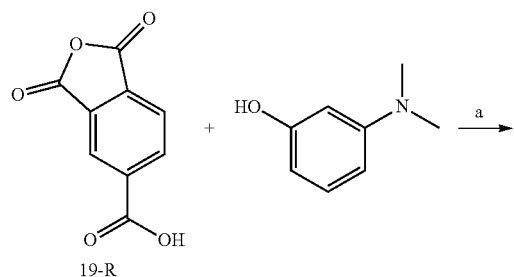

The general methodology given in Scheme 8 allows not only to obtain various esters with a caged rhodamine fragment, but also to saponificate them keeping the Spiro diazoketone fragment intact. If necessary, isomeric esters 20(22-R) and 21(23-R), as well as acids 22-H and 23-H, may be separated, but this procedure is tedious and in most of the practical applications mixtures of 5- and 6-isomers may be applied. For example, the mixture of N-hydroxysuccinimidyl esters 22/23-NHS was used in immunostaining experiments.

Other rhodamines may be caged using the methodology of the present invention. For example, Schemes 9 and 10 illustrate the scope and some limitations associated with the new chemistry introduced here.

Scheme 9. Synthesis of the caged fluorescent dyes - spectral analogues of rhodamine 6G and rhodamine Q:

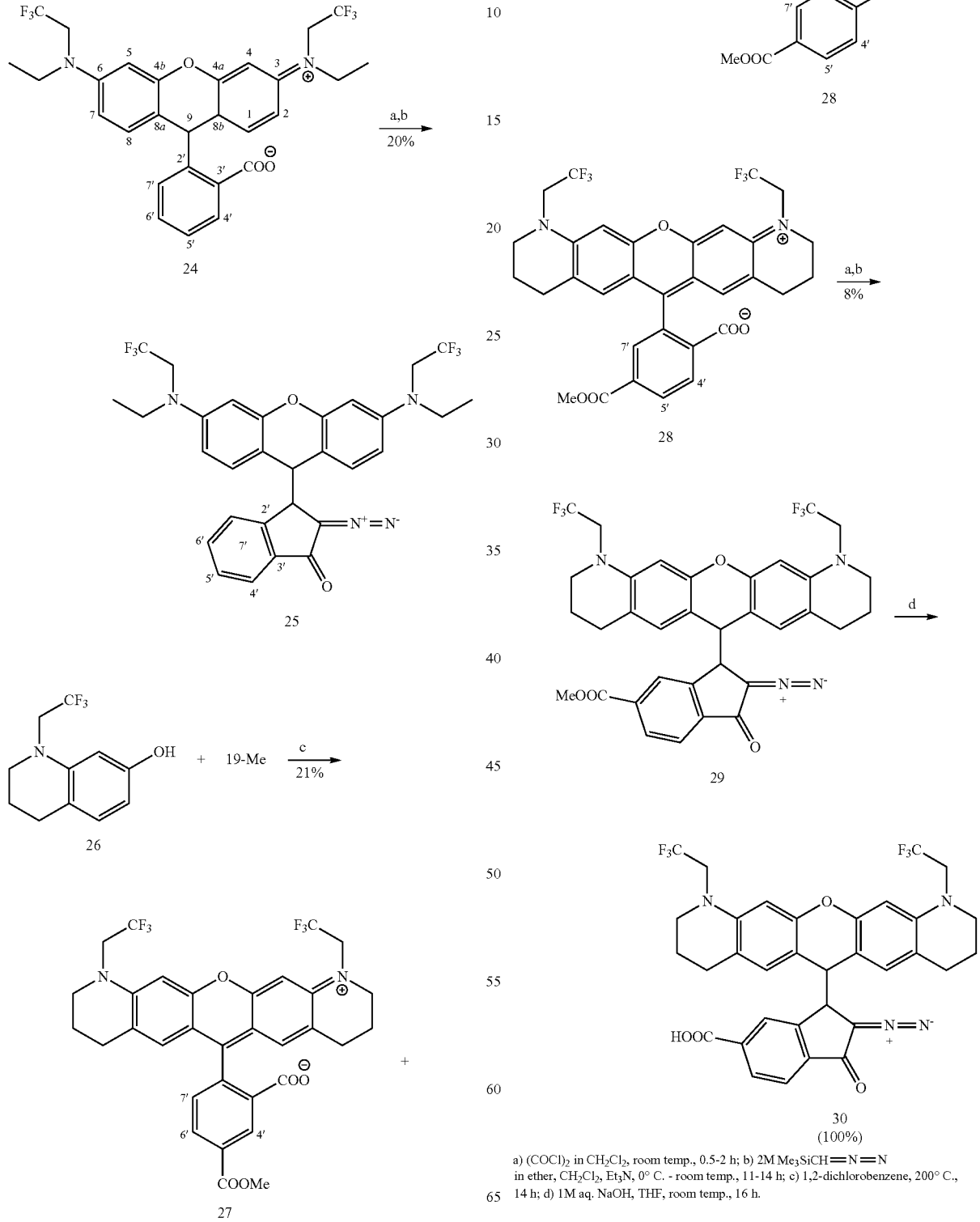

a) (COCl)$_2$ in CH$_2$Cl$_2$, room temp., 0.5-2 h; b) 2M Me$_3$SiCH=N=N in ether, CH$_2$Cl$_2$, Et$_3$N, 0° C. - room temp., 11-14 h; c) 1,2-dichlorobenzene, 200° C., 14 h; d) 1M aq. NaOH, THF, room temp., 16 h.

To exemplify the possibility of multicolour staining with the new caged fluorescent dyes, spectral analogues of rhodamine 6G and rhodamine Q were prepared (Scheme 9). The electronic effects of the $CF_3CH_2$ substituents are similar to these of hydrogen atoms. Therefore, compound 24 has spectral properties (emission and absorption maxima) similar to these of rhodamine 6G (abs./em. at ca. 530/550 nm in MeOH), and rhodamines 27/28 are in this respect the analogues of 5/6-carboxy rhodamine Q (abs./em. at ca. 540/560 nm in MeOH). These values differ from each other and from the spectral positions of the absorption and emission bands found for rhodamine B, TMR and compound 12, all of which absorb at about 560 nm and emit at ca. 580 nm (in MeOH).

Modern microscopes (e.g. Zeiss META system) are able to resolve the differences between the fluorescence maxima, which are only 5-10 nm apart. Using these devices, a tool-box of at least two (caged!) fluorescent colours for multicolour labelling may be created by using for instance, compounds 22/23 for one colour and compound 30 for the other colour. After uncaging with a diode laser irradiating at 375 nm, the fluorescence of both dyes may be excited by the same light source (e.g. at 532 nm). In principle, this approach enables to observe, (co)localize and monitor in time the position of two objects labelled with the caged compounds 22/23 and 30, respectively.

Preparation of the compound class II from the compound class I is exemplified in Scheme 10.

Scheme 10. Synthesis of 1,2,3-thiadiazole 31 (compound class II) from 2-diazoketone 10 (compound class I): a) Lawesson reagent, benzene, relux, 1 h.

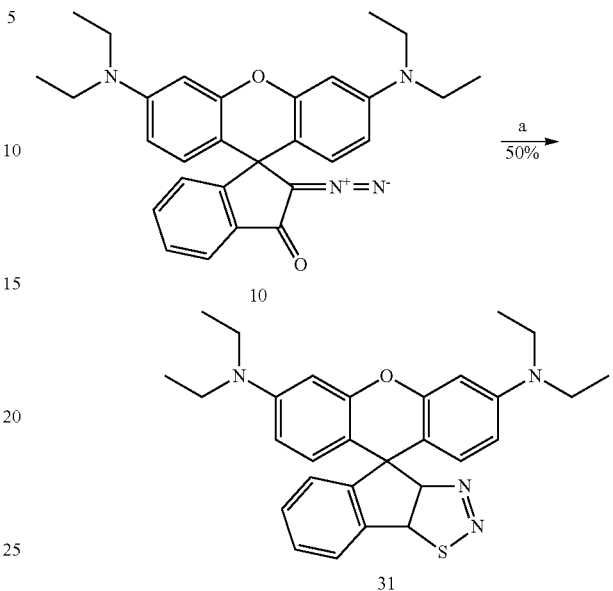

Photolysis of 1,2,3-thiadiazole 31 in methanol was found to be not as clean reaction as the photolysis of diazoketone 10 (Scheme 6). However, as the main product it afforded the colored and fluorescent thioester 32.

Scheme 11. Photolysis of 1,2,3-thiadiazole 31 in methanol.

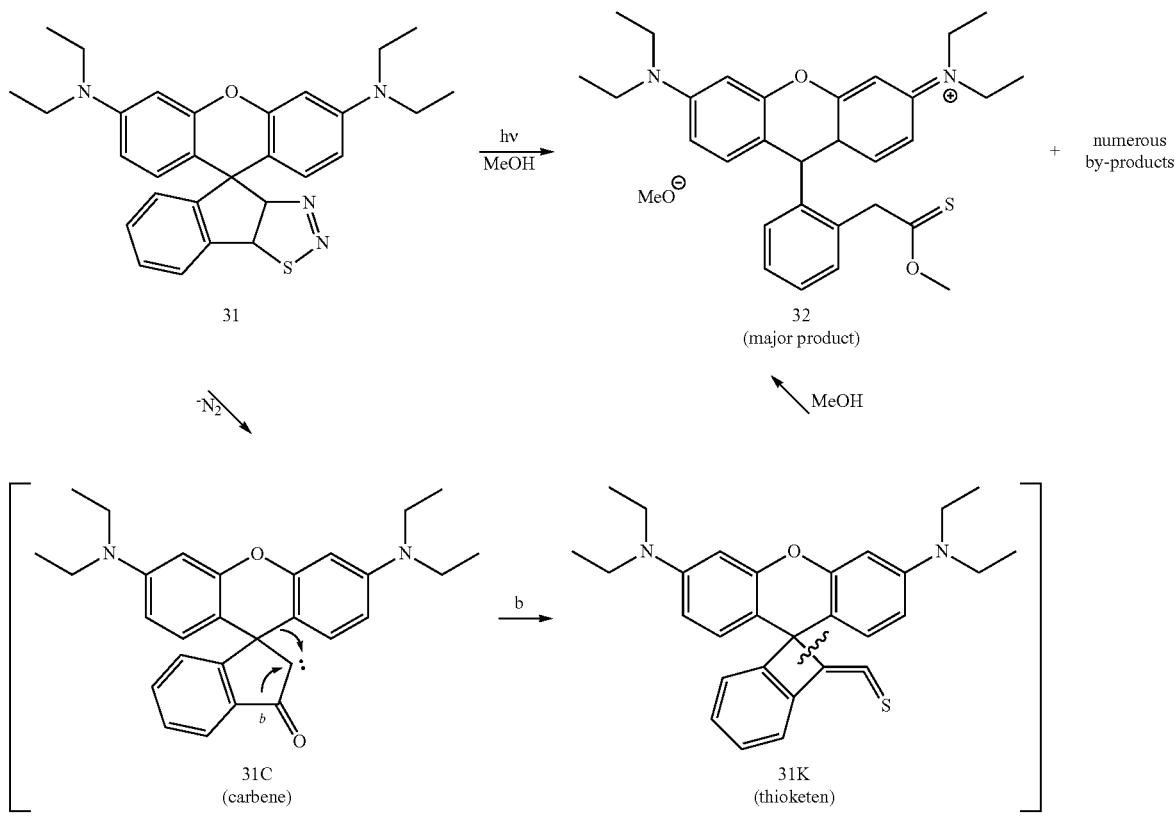

The invention is further illustrated by the following non-limiting Examples and Figures.

FIGURES

FIG. 1. Switching of compounds 22/23 in living and fixed eukaryotic cells. (A) Compounds 22/23 switched in living Ptk2 cells. (B) Compounds 22/23-NHS coupled to antibodies, introduced into fixed cells and switched in Mowiol.

Figure 2:
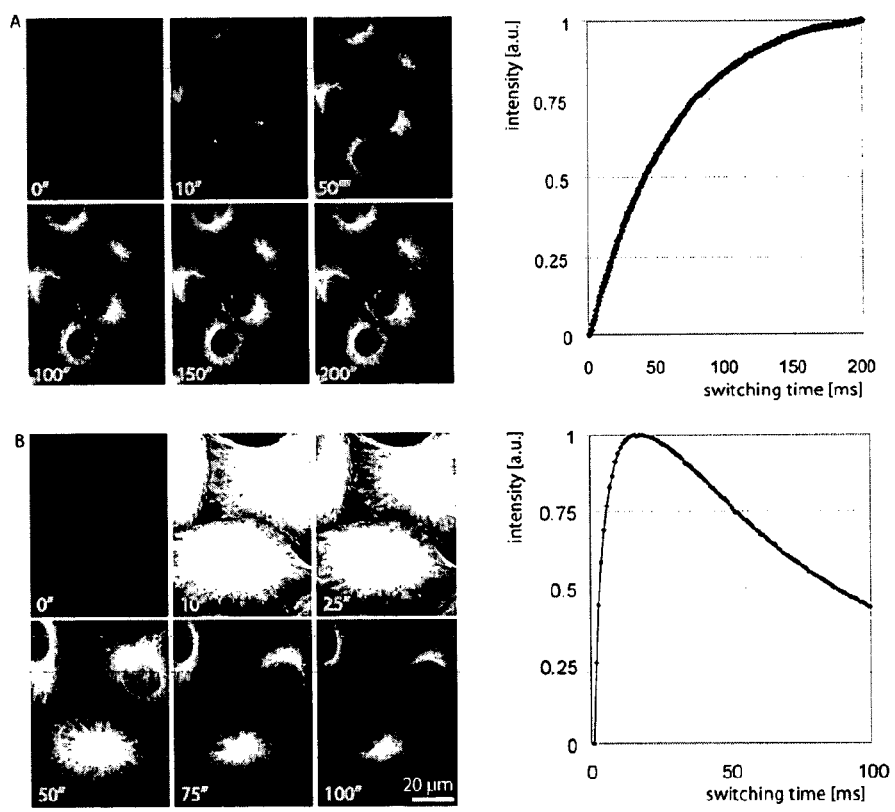

FIG. 2. Intensity-dependent switching kinetics of compounds 22/23. (A) Kinetics under low light intensities, (B) Kinetics under higher light intensities.

Figure 3:
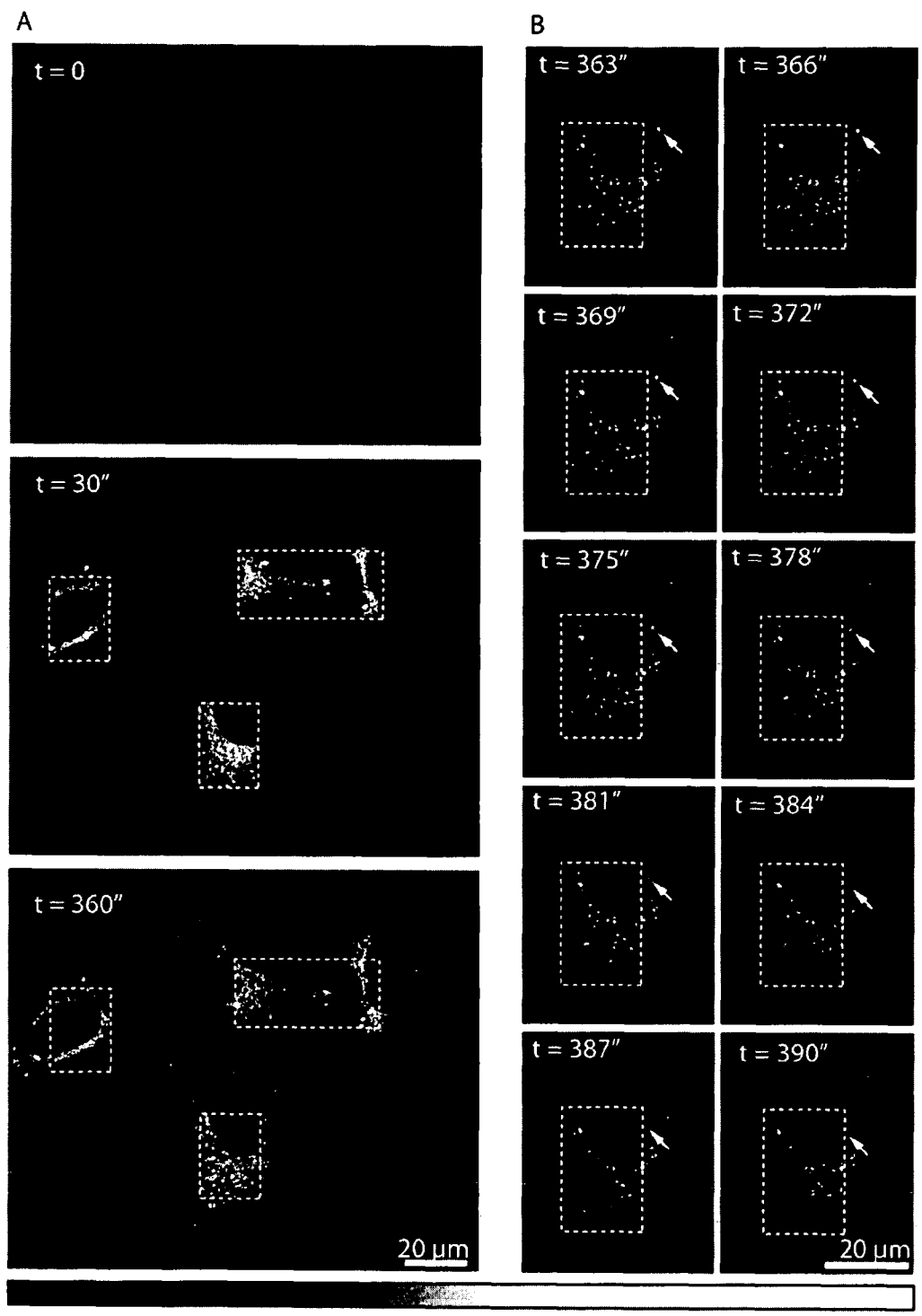

FIG. 3. Tracking of proteins and organelles within living cells (A) images for t=0 (before switching), t=30, and t=360 s; (B) Close-up of t=363 s to t=390 s.

Figure 4:
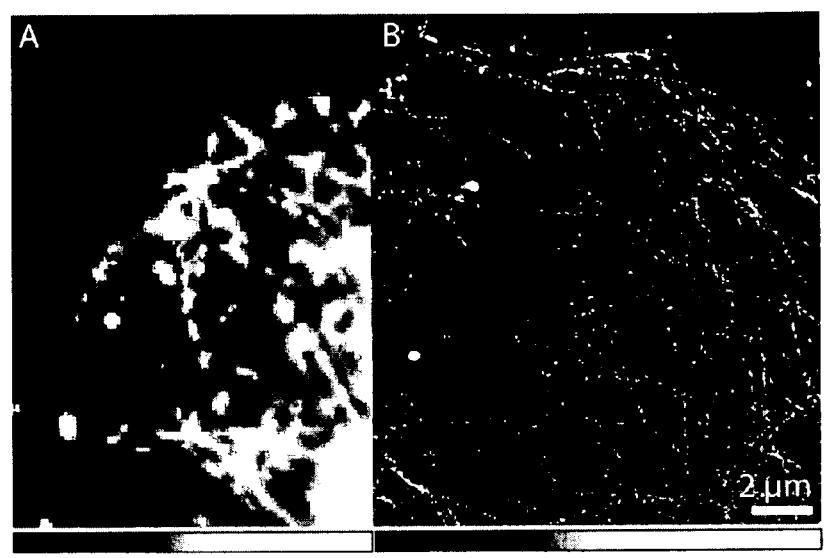

FIG. 4. Conventional microscopic image (A) and single molecule localization microscopic (SMLM) image (B) of the microtubule network in a whole fixed PtK2 cell immunolabelled with secondary antibodies conjugated with compounds 22/23-NHS.

INSTRUMENTS AND GENERAL PARAMETERS OF THE DETECTION METHODS USED

NMR spectra were recorded with Varian MERCURY 300 spectrometer at 300 ($^1$H) and 75.5 MHz ($^{13}$C and APT). All spectra are referenced to tetramethylsilane as an internal standard ($\delta$=0 ppm) using the signals of the residual protons of CHCl$_3$ (7.26 ppm) in CDCl$_3$, CHD$_2$OD (3.31 ppm) in CD$_3$OD, HOD (4.79 ppm) in D$_2$O or [D$_5$] DMSO (2.50 ppm) in [D$_6$] DMSO. Multiplicities of signals are described as follows: s=singlet, br. s=broad singlet, d=doublet, br. d=broad doublet, t=triplet, q=quartet, m=multiplet. Coupling constants (J) are given in Hz. Multiplicities in the $^{13}$C NMR spectra were determined by APT (Attached Proton Test) measurements. Low resolution mass spectra (electro spray ionization, ESI) were obtained with LCQ spectrometer. High resolution mass spectra (ESI-HRMS) were obtained on APEX IV spectrometer. HPLC system (Knauer): Smartline pump 1000 (2×), UV detector 2500, column thermostat 4000, mixing chamber, injection valve with 20 and 100 μL loop for the analytical and preparative columns, respectively; 6-port-3-channel switching valve; analytical column: Eurospher-100 C18, 5 μm, 250×4 mm, 1 mL/min; solvent A: water+0.1% v/v trifluoroacetic acid (TFA); solvent B: MeCN+0.1% v/v TFA; A/B:60/40→0/100 in 25 min (unless stated otherwise); 25° C., detection at 254 nm. Analytical TLC was performed on MERCK ready-to-use plates with silica gel 60 (F$_{254}$). Column chromatography: MERCK silica gel, grade 60, 0.04-0.063 mm. Elemental analyses were carried out at Mikroanalytisches Laboratorium des Instituts für Organische und Biomolekulare Chemie der Georg-August-Universität Göttingen. Organic solutions were dried over MgSO$_4$ or Na$_2$SO$_4$. Preparative photolysis reactions were performed with middle-pressure mercury lamp (150 W) with boronsilica glass filter (ca. 50% transmission at 320 nm) using the laboratory reactor UV-RS-1 manufactured by UV-Consulting Peschl (Mainz, Germany). The following commercially available microscopes were used for the (diffraction limited) uncaging experiments with antibodies labelled with NHS-ester(s) 22/23-NHS: 1) epifluorescence microscope Leica DM6000, 2) confocal microscope Leica TCS SP5. Single molecule switching (SMS) experiments were performed using the PALMIRA setup [A. Egner, C. Geisler, C. von Middendorff, H. Bock, D. Wenzel, R. Medda, M. Andresen, A. C. Stiel, S. Jakobs, C. Eggeling, A. Schonle, S. W. Hell, Biophys. J. 2007, 93, 3285-3290] equipped with 532 nm solid state laser and an additional optical path for the diode laser operating at 375 nm.

EXAMPLE 1

Synthesis and Photolysis of Specific Compounds of Formulae I-III

Diazomethane. Diazomethane should be handled with care since it is known to be carcinogenic and may explode on heating. Erlenmeyer (conical) flasks may be used for its synthesis. Diazomethane was prepared in THF (150 mL, without peroxides) using N-nitroso-N-methylurea (NMU, 7.3 g) and 40% aq. KOH solution (100 g) at 0°-5° C. External cooling with an ice or ice-salt bath should be used. NMU was carefully introduced in small portions with a plastic spatula into the two-phase system consisting of THF and aq. KOH at 0-5° C. with a temperature control inside the flask. No mechanical stirring! The reaction mixture may be shaken or stirred by hand with another plastic spatula. (Only new flasks and thermometers without ground joints and scratches should be used). After the reaction was complete, the yellow organic solution was carefully decanted from the lower aqueous layer to the new flask with solid KOH. After drying for 30 min at 0° C., the solution was used for the synthesis of diazoketones. The freshly prepared diazomethane solution may be kept at −20° C. for several days.

Diazoketone 10: Rhodamine B (1.1 g, 2.3 mmol) and 1,2-dichloroethane (DCE, 11 mL) were placed into a dry 250 mL Schlenk flask. POCl$_3$ (0.9 mL, 9.7 mmol) was added, and the mixture was refluxed for 4 h. Then the solvent and excess of POCl$_3$ were removed in vacuo. The residue was dissolved with THF (10 mL), and a solution of CH$_2$N$_2$ (ca. 72 mmol) in THF (150 mL) was added to the reaction mixture at 0° C. with stirring. The reaction mixture was kept for 12 h at room temperature. Then the solvent and excess of CH$_2$N$_2$ were removed in vacuo [outlet of the vacuum pump has to be inside a well-ventilated hood], and the title product was isolated from the residue by column chromatography (CH$_2$Cl$_2$). The pure title compound was obtained after crystallization from the mixture of CH$_2$Cl$_2$ and MeOH (1:2); yield 0.77 g (72%); m. p. 194° C. (dec.). HPLC: $t_R$=2.5 min; HPLC (conditions: A/B: 70/30→0/100 in 25 min): $t_R$=7.8 min. UV (MeCN): $\lambda_{max}$=241 nm ($\epsilon$=59700), 268 nm (sh.), 312 nm (sh). $^1$H NMR (CDCl$_3$, 300 MHz, ppm), $\delta$=1.15 (t, J=7.1, 12 H; (CH$_2$)CH$_3$), 3.31 (q, J=7.1, 8 H; NCH$_2$(CH$_3$)), 6.28 (dd, J=2.7 and 8.8, 2 H; H-2/7), 6.37 (d, J=2.6, 2 H; H-4/5), 6.67 (d, J=8.8, 2 H; H-1/8), 7.08 (br. d, J=7.6, 1 H; H-7'), 7.34-7.40 (m, 1 H; H-6'), 7.42-7.48 (m, 1 H; H-5'), 7.80 (br. d, J=6.8, 1 H; H-4'). $^{13}$C NMR (CDCl$_3$, 75.5 MHz, ppm), $\delta$=12.6 ((CH$_2$)CH$_3$), 44.3 (NCH$_2$(CH$_3$)), 49.1 (C; C-1'), 76.8 (C; CN$_2$), 98.1 (CH; C-4/5), 107.6 (C; C-8a/8b), 108.0 (CH; C-2/7), 122.0 (CH; C-7'), 125.5 (CH; C-4'), 128.1 (CH; C-5'), 128.7 (CH; C-1/8), 134.46 (CH; C-6'), 134.53 (C; C-2'), 148.3 (C; C-3/6), 152.5 (C; C-4a/4b), 156.4 (C; C-3'), 187.5 (CO). ESI-MS, positive mode: m/z (rel. int., %)=489 (31) [M+Na]$^+$, 955 (100) [2M+Na]$^+$. EI-MS: m/z (rel. int., %)=466 [M]$^+$ (20), 438 [M-N$_2$]$^+$ (100), 423 [M-N$_2$—CH$_3$]$^+$ (35). C$_{29}$H$_{30}$N$_4$O$_2$, HR-MS (ESI, positive mode): 467.2430 [M+H]$^+$ (found). 467.2442 (calculated).

Photolysis of diazoketone 10: A solution of compound 10 (70 mg, 0.15 mmol) in MeOH (150 mL) was placed into a reactor for photolysis, and nitrogen was bubbled for 30 min through the solution at room temperature with stirring. Then the lamp was turned on, and the reaction mixture was irradiated at ambient temperature with stirring under N$_2$ for 40 min, until the starting compound could not be detected on TLC. The solvent was removed in vacuo. The residue was dissolved in $CH_2Cl_2$, and the two products were isolated by column chromatography ($CH_2Cl_2$, then $CH_2Cl_2$/MeOH 5:1).

Compound 11 with a higher $R_f$-value eluted first, yielding 11 mg (17%) of a dark solid. HPLC: $t_R$=8.9 min. UV (MeOH): $\lambda_{max}$=574 nm ($\epsilon$=3980). $^1$H NMR (CDCl$_3$, 300 MHz, ppm), δ=1.17 (t, J=7.1, 6 H; (CH$_2$)CH$_3$), 1.20 (t, J=7.1, 6 H; (CH$_2$)CH$_3$), 3.36 (q, J=7.0, 4 H; NCH$_2$(CH$_3$)), 3.40 (q, J=7.0, 4 H; NCH$_2$(CH$_3$)), 6.49-6.53 (m, 2 H; H-2/7), 6.54 (d, J=2.1, 1 H; H-4(5)), 6.58 (d, J=2.7, 1 H; H-5(4)), 7.15-7.23 (m, 1 H; H-4'), 7.28-7.34 (m, 1 H; H-5'), 7.39 (br. d, J=7.2, 1 H; H-6'), 7.50 (br. d, J=7.0, 1 H; H-3'), 7.58 (d, J=8.8, 1 H; H-8), 7.77 (d, J=9.3, 1 H; H-1). $^{13}$C NMR (CDCl$_3$, 75.5 MHz, ppm), δ=12.55 ((CH$_2$)CH$_3$), 12.57 ((CH$_2$)CH$_3$), 44.5 (NCH$_2$(CH$_3$)), 44.6 (NCH$_2$(CH$_3$)), 103.6 and 104.5 (2CH; C-4/5), 107.8 and 108.6 (2CH; C-2/7), 112.8 and 114.1 (2CH; C-8a/8b), 120.8 (CH; C-6'), 122.3 (CH; C-3'), 126.9 (C; C-1'), 127.9 (CH; C-4'), 128.3 (CH; C-8), 129.8 (CH; C-1), 132.7 (CH; C-5'), 144.2 (C; C-6a'), 149.5 (C; C-3), 151.5 (C; C-6), 158.4 (C; C-4a), 159.8 (C; C-4b), 195.8 (CO). ESI-MS, positive mode: m/z (rel. int., %)=461 (33) [M+Na]$^+$, 439 (100) [M+H]$^+$, 438 (100) [M]$^+$, EI-MS: m/z (rel. int., %)=438 [M]$^+$ (100), 423 [M-CH$_3$]$^+$ (28). DCI-MS: m/z (rel. int., %)=439 (100) [M+H]$^+$. C$_{29}$H$_{30}$N$_2$O$_2$, HR-MS (ESI, positive mode): 438.23015 [M]$^+$ (found), 439.23018 (calculated); 439.23796 [M+H]$^+$ (found). 438.23800 (calculated).

Compound 12, which eluted after that, was isolated as a dark red solid; yield 25 mg (35%); HPLC: $t_R$=8.8 min. UV (MeOH): $\lambda_{max}$=559 nm ($\epsilon$=65600), $\lambda_{em}$=579 nm, $\Phi_{fl}$=0.37. $^1$H NMR (CDCl$_3$, 300 MHz, ppm), δ=1.29 (t, J=7.1, 12 H; (CH$_2$)CH$_3$), 3.35 (s, 2 H; CH$_2$CO$_2$CH$_3$), 3.39 (s, 3 H; CO$_2$CH$_3$), 3.63 (q, J=7.1, 8 H; NCH$_2$(CH$_3$)), 6.82 (d, J=2.3, 2 H; H-4/5), 6.88 (dd, J=2.4 and 9.5, 2 H; H-2/7), 7.10 (d, J=9.5, 2 H; H-1/8), 7.16 (dd, J=1.1 and 7.1, 1 H; H-7'), 7.42-7.60 (m, 3 H; H-4'/5'/6'). $^{13}$C NMR (CDCl$_3$, 75.5 MHz, ppm), δ=12.6 ((CH$_2$)CH$_3$), 29.6 ((CH$_2$CO$_2$CH$_3$), 38.6 (NCH$_2$(CH$_3$)), 52.0 (OCH$_3$) 96.5 (CH; C-4/5), 113.6 (C; C-8a/8b), 114.3 (CH; C-2/7), 127.8 (CH), 129.3 (CH), 130.4 (CH), 131.2 (CH), 131.7 (CH; C-1/8), 131.9 (C), 132.4 (C), 155.7 (C; C-3/6), 157.8 (C; C-4a/4b), 156.0 (C), 170.7 (CO$_2$CH$_3$). ESI-MS, positive mode: m/z (rel. int., %)=471 (100) [M+H]$^+$. C$_{30}$H$_{35}$N$_2$O$_3$(+), HR-MS (ESI, positive mode): 471.2629 [M]$^+$ (found). 471.2642 (calculated).

Mixture of TMR 5/6-carboxylates (15+16): A mixture of finely grounded 3-(N,N-dimethylamino)phenol (2.6 g, 19 mmol) and trimellitic anhydride (4.8 g, 26 mmol) was heated at 170° C. for 3 h. An additional portion of 3-(N,N-dimethylamino)phenol (2.6 g, 19 mmol) and 85% aq. H$_3$PO$_4$ (7 mL) were added to the cooled reaction mixture, and heating was continued at 170° C. for 3 h. After cooling, the reaction mixture was stirred and refluxed with a mixture of methanol (150 mL) and water (50 mL) for several minutes, cooled, and kept at room temperature for 10 h. The precipitate was filtered off, yielding a mixture of compounds 15 (major diastereomer, HPLC: $t_R$=8.2 min) and 16 (minor diastereomer, HPLC: $t_R$=9.2 min); 0.94 g (12%). ESI-MS, positive mode: m/z (rel. int., %)=431 (100) [M+H]$^+$. ESI-MS, negative mode: m/z (rel. Int., %)=429 (100) [M–H]$^-$.

The product was recrystallized from methanol and the isomer (0.64 g, 8%) with content of the major diastereomer of about 90% was isolated.

Bis-diazoketone 17: Crude rhodamine 15 (0.11 g, 0.25 mmol) and DCE (1.0 mL) were placed into a dry 50 mL Schlenk flask under N$_2$. POCl$_3$ (0.6 mL, 6.4 mmol) was added to the flask. The mixture was refluxed for 3.5 h. Then the solvent and excess of POCl$_3$ were removed in vacuo. The residue was dissolved with THF (5 mL), and a solution of CH$_2$N$_2$ (10 mmol) in THF (30 mL) was added to the reaction mixture at 0° C. with stirring. The reaction mixture was kept at room temperature for 18 h. The solvent and excess of CH$_2$N$_2$ were removed in vacuo [outlet of the vacuum pump has to be inside a well-ventilated hood], and the title product was isolated from the residue by column chromatography (CH$_2$Cl$_2$/EtOAc (10:1)); yield 25 mg (21%). HPLC: $t_R$=10.9 min. $^1$H NMR (CDCl$_3$, 300 MHz, ppm), δ=2.94 (s, 12 H; NCH$_2$), 5.76 (s, 1 H; COCHN$_2$), 6.35 (dd, J=2.6 and 8.8, 2 H; H-2/7), 6.43 (d, J=2.6, 2 H; H-4/5), 6.68 (d, J=8.8, 2 H; H-1/8), 7.36 (d, J=0.8, 1 H; H-7'), 7.77 (dd, J=1.5 and 8.0, 1 H; H-5'), 7.86 (d, J=8.0, 1 H; H-4'). $^{13}$C NMR (CDCl$_3$, 75.5 MHz, ppm), δ=40.3 (NCH$_3$), 49.2 (C; C-1'), 55.1 (CH; COCHN$_2$), 78.1 (C; CN$_2$), 99.3 (CH; C-4/5), 107.6 (C; C-8a/8b), 108.9 (CH; C-2/7), 122.5 (CH; C-4'), 123.7 (CH; C-7'), 126.8 (CH; C-5'), 128.4 (CH; C-1/8), 137.9 (C; C-3'), 141.8 (C; C-6'), 151.1 (C; C-3/6), 152.1 (C; C-4a/4b), 156.5 (C; C-2'), 185.1 (COCHN$_2$), 185.9 (CO). ESI-MS, positive mode: m/z (rel. int., %)=501 (14) [M+Na]$^+$, 979 (100) [2M+Na]$^+$; found, %: C, 67.90; H, 4.90; N, 17.30. anal. calcd. (%) for C$_{27}$H$_{22}$N$_6$O$_3$ (478.50): C, 67.77; H, 4.63; N, 17.56.

Mono-diazoketone 18: Bis-diazoketone 17 (0.11 g, 0.25 mmol) was dissolved in a mixture of CH$_2$Cl$_2$ (1 mL) and MeOH (1 mL). A suspension of PhCO$_2$Ag (10 mg, 0.05 mmol) and Et$_3$N (0.2 mL, 1.5 mmol) in MeOH (0.8 mL) was added to the reaction mixture at room temperature. The mixture was stirred at room temperature for 8 h, and then filtered through a plug of SiO$_2$. The solvent was removed in vacuo, and the title product was isolated from the residue by column chromatography (CH$_2$Cl$_2$/EtOAc (4:1)); yield 20 mg (18%). HPLC: $t_R$=10.7 min. $^1$H NMR (CDCl$_3$, 300 MHz, ppm), δ=2.95 (s, 12 H; NCH$_3$), 3.53 (s, 2 H; ArCH$_2$CO$_2$CH$_3$), 3.60 (s, 1 H; ArCH$_2$CO$_2$CH$_3$), 6.36 (dd, J=2.5 and 8.7, 2 H; H-2/7), 6.42 (d, J=2.5, 2 H; H-4/5), 6.71 (d, J=8.7, 2 H; H-1/8), 6.90 (br. s, 1 H; H-7'), 7.35 (br. d, J=7.9, 1 H; H-5'), 7.77 (d, J=7.9, 1 H; H-4'). $^{13}$C NMR (CDCl$_3$, 75.5 MHz, ppm), δ=40.3 (NCH$_8$), 41.1 (CH; ArCH$_2$CO$_2$CH$_3$), 48.9 (C; C-1'), 52.1 (OCH$_3$), 77.1 (C; CN$_2$), 99.1 (CH; C-4/5), 108.5 (C; C-8a/8b), 108.8 (CH; C-2/7), 122.3 (CH), 126.3 (CH), 128.6 (CH; C-1/8), 129.6 (CH), 133.6 (C), 140.8 (C), 151.0 (C; C-3/6), 152.1 (C; C-4a/4b), 156.6 (C), 171.0 (CO$_2$CH$_3$), 186.8 (CO). ESI-MS, positive mode: m/z (rel. int., %)=505 (41) [M+Na]$^+$, 987 (100) [2M+Na]$^+$. ESI-MS, negative mode: m/z (rel. int., %)=481 (100) [M–H]$^-$. C$_{28}$H$_{26}$N$_4$O$_4$, HR-MS (ESI, positive mode): 483.20271 [M+H]$^+$(found). 483.20268 (calculated).

Esters 20-Et+21-Et: A mixture of 3-(N,N-dimethylamino)phenol (1.65 g, 12 mmol), trimellitic anhydride monoethyl ester 19-Et (3.1 g, 14 mmol), and 1,2-dichlorobenzene (12 mL) was heated at 190° C. for 5 min with stirring under N$_2$. Then an additional portion of 3-(N,N-dimethylamino)phenol (1.65 g, 12 mmol) was added to the cooled reaction mixture and heating was continued at 190° C. for 19 h. Then the solvent was removed in vacuo, and the title product was isolated from the residue by column chromatography (CH$_2$Cl$_2$/MeOH (2:1)) as a mixture of two regioisomers (2:1; according to $^1$H NMR data); yield –2.9 g (53%). HPLC: $t_R$=11.3 min (for both inseparable isomers). ESI-MS, positive mode: m/z (rel. int., %)=459 (100) [M+H]$^+$, 481 (8) [M+Na]$^+$.

The major isomer 21-Et: $^1$H NMR (CD$_3$OD, 300 MHz, ppm), δ=1.44 (t, J=7.2, 3 H; (CH$_2$)CH$_3$), 3.25 (s, 12 H; NCH$_3$), 4.45 (q, J=7.2, 2 H; OCH$_2$(CH$_3$)), 6.86-6.90 (m, 2 H; H-4/5), 6.94-7.02 (m, 2 H; H-2/7), 7.21 (d, J=9.5, 2 H; H-1/8), 7.36 (d, J=7.9, 1 H; H-7'), 8.21 (dd, J=1.8 and 7.9, 1 H; H-6'), 8.74 (d, J=1.5, 1 H; H-4').

The minor isomer 20-Et: $^1$H NMR (CD$_3$OD, 300 MHz, ppm), δ=1.36 (t, J=7.1, 3 H; (CH$_2$)CH$_3$), 3.25 (s, 12 H; NCH$_3$), 4.36 (q, J=7.1, 2 H; OCH$_2$(CH$_3$)), 6.86-6.90 (m, 2 H; H-4/5), 6.94-7.02 (m, 2 H; H-2/7), 7.22 (d, J=9.5, 2 H; H-1/8), 7.85 (d, J=1.3, 1 H; H-7'), 8.13 (d, J=8.1, 1 H; H-4'), 8.26 (dd, J=1.7 and 8.1, 1 H; H-5').

Diazoketones 22-Et+23-Et: A mixture of regioisomers 20-Et+21-Et (0.94 g, 2.0 mmol) was dissolved with CH$_2$Cl$_2$ (20 mL), and oxalyl chloride ((COCl)$_2$, 0.9 mL, 11 mmol) was added to the flask. The mixture was kept at room temperature for 4 h. Then the solvent and excess of (COCl)$_2$ were removed in vacuo. The residue was dissolved with CH$_2$Cl$_2$ (20 mL); Et$_3$N (0.25 mL) and a solution of Me$_3$SiCHN$_2$ in Et$_2$O (2 mL of 2 M solution, 4 mmol) were added to the reaction mixture at 0° C. with stirring. The reaction mixture was kept at room temperature for 18 h. Then the solvent and excess of Me$_3$SiCHN$_2$ were removed in vacuo (hood!), and the title product was isolated from the residue by column chromatography (CH$_2$Cl$_2$/EtOAc (10:1)), yielding 0.77 g (80%) of a crude mixture of the regioisomers. UV (MeCN): λ$_{max}$=232 nm (ε=74300), 263 nm (sh), 306 nm (sh). ESI-MS, positive mode: m/z (rel. int., %)=505 (16) [M+Na]$^+$, 537 (100) [M+Na+MeOH]$^+$, 979 (70) [2M+Na]$^+$; found, %: C, 69.75; H, 5.24; N, 11.47. anal. calcd. (%) for C$_{28}$H$_{26}$N$_4$O$_4$ (482.20): C, 69.70; H, 5.43; N, 11.61.

The major isomer 23-Et: HPLC: t$_R$=16.2 min. $^1$H NMR (CDCl$_3$, 300 MHz, ppm), δ=1.37 (t, J=7.2, 3 H; (CH$_2$)CH$_3$), 2.95 (s, 12 H; NCH$_3$), 4.37 (q, J=7.2, 2 H; OCH$_2$(CH$_3$)), 6.35 (dd, J=2.6 and 8.7, 2 H; H-2/7), 6.43 (d, J=2.5, 2 H; H-4/5), 6.69 (d, J=8.7, 2 H; H-1/8), 7.10 (d, J=8.1, 1 H; H-7'), 8.11 (dd, J=1.6 and 8.1, 1H; H-6'), 8.47 (d, J=1.2, 1 H; H-4'). $^{13}$C NMR (CDCl$_3$, 75.5 MHz, ppm), δ=14.3 (CH$_2$CH$_3$), 40.3 (NCH$_3$), 49.2 (C; C-1'), 61.3 (OCH$_2$CH$_3$), 77.1 (CN$_2$), 99.2 (CH; C-4/5), 107.7 (C; C-8a/8b), 108.9 (CH; C-2/7), 123.7 (CH), 125.4 (CH), 128.5 (CH; 0-1/8), 130.8 (C), 134.7 (C), 135.5 (CH), 151.1 (C; C-3/6), 152.1 (C; C-4a/4b), 160.1 (C), 165.6 (CO$_2$CH$_3$), 186.2 (CO).

The minor isomer 22-Et: HPLC: t$_R$=15.3 min. $^1$H NMR (CDCl$_3$, 300 MHz, ppm), δ=1.29 (t, J=7.2, 3 H; (CH$_2$)CH$_3$), 2.95 (s, 12 H; NCH$_3$), 4.26 (q, J=7.2, 2 H; OCH$_2$(CH$_3$)), 6.35 (dd, J=2.6 and 8.8, 2 H; H-2/7), 6.44 (d, J=2.7, 2 H; H-4/5), 6.68 (d, J=8.7, 2 H; H-1/8), 7.68 (br. s, 1 H; H-7'), 7.86 (dd, J=0.6 and 8.0, 1 H; H-4'), 8.06 (dd, J=1.4 and 8.0, 1 H; H-5'). $^{13}$C NMR (CDCl$_3$, 75.5 MHz, ppm), δ=14.2 (CH$_2$CH$_3$), 40.3 (NCH$_3$), 49.1 (C; C-1'), 61.4 (OCH$_2$CH$_3$), 77.2 (CN$_2$), 99.3 (CH; C-4/5), 107.7 (C; C-8a/8b), 108.9 (CH; C-2/7), 122.1 (CH), 126.7 (CH), 128.5 (CH; C-1/8), 129.6 (C), 136.0 (C), 138.2 (CH), 151.1 (C; C-3/6), 152.2 (C; C-4a/4b), 156.0 (C), 165.6 (CO$_2$CH$_3$), 186.1 (CO).

Esters 20-Me+21-Me: A mixture of 3-(N,N-dimethylamino)phenol (3.3 g, 24 mmol), trimellitic anhydride monomethyl ester 19-Me (3.45 g, 17 mmol), and 1,2-dichlorobenzene (20 mL) was heated at 190° C. with stirring under N$_2$ for 5.5 h. Then the solvent was removed in vacuo, and the title product was isolated from the residue by column chromatography (CH$_2$Cl$_2$/MeOH (2:1)), yielding 3.1 g (58%) of a mixture of two regioisomers. ESI-MS, positive mode: m/z (rel. int., %)=445 (100) [M+H]$^+$, 467 (5) [M+Na]$^+$.

21-Me: HPLC: t$_R$=9.8 min. $^1$H NMR (CD$_3$OD, 300 MHz, ppm), δ=3.23 (s, 12 H; NCH$_3$), 4.00 (s, 3 H; OCH$_3$), 6.80-6.85 (m, 2 H; H-4/5), 6.91-7.00 (m, 2 H; H-2/7), 7.20 (d, J=9.4, 2 H; H-1/8), 7.37 (d, J=7.9, 1 H; H-7'), 8.20 (dd, J=1.7 and 7.9, 1 H; H-6'), 8.74 (d, J=1.5, 1 H; H-4').

20-Me: HPLC: t$_R$=9.5 min. $^1$H NMR (CD$_3$OD, 300 MHz, ppm), δ=3.22 (s, 12 H; NCH$_3$), 3.87 (s, 3 H; OCH$_3$), 6.80-6.85 (m, 2 H; H-4/5), 6.91-7.00 (m, 2 H; H-2/7), 7.19 (d, J=9.4, 2 H; H-1/8), 7.85 (d, J=1.6, 1 H; H-7'), 8.14 (d, J=8.2, 1 H; H-4'), 8.24 (dd, J=1.7 and 8.1, 1 H; H-5').

Diazoketone 23-Me: A mixture of regioisomers 20-Me+21-Me (1.53 g, 3.4 mmol) was dissolved with CH$_2$Cl$_2$ (30 mL), and (COCl)$_2$ (1.1 mL, 13 mmol) was added to the flask. The mixture was kept at room temperature for 2 h. Then the solvent and excess of (COCl)$_2$ were removed in vacuo. The residue was dissolved in CH$_2$Cl$_2$ (30 mL). Et$_3$N (0.60 mL, 4.2 mmol) and a solution of Me$_3$SiCHN$_2$ in Et$_2$O (3 mL of 2 M solution, 6 mmol) were added to the reaction mixture at room temperature with stirring. The reaction mixture was kept at room temperature for 11 h. Then the solvent and excess of Me$_3$SiCHN$_2$ were removed in vacuo, and the title product was isolated from the residue by column chromatography (CH$_2$Cl$_2$/EtOAc (20:1)), yield of the crude mixture of the regioisomers 0.92 g (57%). After crystallization from CH$_2$Cl$_2$/methanol (1:4), the pure isomer 23-Me (0.72 g, 45%) was isolated; m. p.>215° C. (dec.). UV (MeCN): λ$_{max}$=231 nm (E=82700), 263 nm (sh), 306 nm (sh). ESI-MS, positive mode: m/z (rel. int., %)=523 (58) [M+Na+MeOH]$^+$, 959 (100) [2M+Na]$^+$, 1427 (35) [3M+Na]$^+$. Found, %: C, 69.05; H, 5.07; N, 11.83. anal. calcd. (%) for C$_{27}$H$_{24}$N$_4$O$_4$ (468.50): C, 69.22; H, 5.16; N, 11.96. HPLC: t$_R$=14.2 min. $^1$H NMR (CDCl$_3$, 300 MHz, ppm), δ=2.94 (s, 12 H; NCH$_3$), 3.91 (s, 3 H; OCH$_3$), 6.35 (dd, J=2.6 and 8.8, 2 H; H-2/7), 6.43 (d, J=2.7, 2 H; H-4/5), 6.70 (d, J=8.7, 2 H; H-1/8), 7.10 (dd, J=0.7 and 8.1, 1 H; H-7'), 8.11 (dd, J=1.6 and 8.1, 1 H; H-6'), 8.47 (dd, J=0.7 and 1.7, 1 H; H-4'). $^{13}$C NMR (CDCl$_3$, 75.5 MHz, ppm), δ=40.3 (NCH$_3$), 49.1 (C; C-1'), 52.4 (OCH$_3$), 77.1 (CN$_2$), 99.2 (CH; C-4/5), 107.7 (C; C-8a/8b), 108.9 (CH; C-2/7), 123.8 (CH), 125.5 (CH), 128.4 (CH; C-1/8), 130.5 (C), 134.7 (C), 135.5 (CH), 151.1 (C; C-3/6), 152.1 (C; C-4a/4b), 160.2 (C), 166.1 (CO$_2$CH$_3$), 186.1 (CO). Compound 22-Me: HPLC: t$_R$=13.8 min.

Carboxylic acids 22-H+23-H: A mixture of the regioisomers 22-Et+23-Et (0.37 g, 0.77 mmol) was dissolved in THF (20 mL) and EtOH (50 mL) under N$_2$, and 1 M aq. NaOH (5 mL) was added. The reaction mixture was kept at room temperature for 16 h. Volatile solvents were evaporated in vacuo, the residue was dissolved in H$_2$O (20 mL), and acidified with 1 M aq. HCl to pH=6. The title compounds were extracted with CH$_2$Cl$_2$. The organic layer was dried with Na$_2$SO$_4$, the solvent was removed in vacuo, and the product was purified by column chromatography (CH$_2$Cl$_2$/MeOH (5:1)) yielding the mixture of the regioisomers 22-H and 23-H, 0.32 g (92%). ESI-MS, positive mode: m/z (rel. int., %)=455 (23) [M+H]$^+$, 909 (10) [2M+H]$^+$, 931 (100) [2M+Na]$^+$. ESI-MS, negative mode: m/z (rel. int., %)=453 (96) [M–H]$^-$, 907 (100) [2M–H]$^-$, 1361 (14) [3M–H].

A sample (0.10 g) was crystallized from CH$_2$Cl$_2$/methanol mixture (1:4) and gave the pure acid 22-H. Found, %: C, 68.91; H, 4.74; N, 12.10. calcd. (%) for C$_{26}$H$_{22}$N$_4$O$_4$ (454.48): C, 68.71; H, 4.88; N, 12.33. HPLC: t$_R$=7.8 min. UV (MeOH): λ$_{max}$=231 nm (ε=64000), 262 nm (sh), 307 nm (ε=19000). $^1$H NMR (CDCl$_3$, 300 MHz, ppm), δ=2.93 (s, 12 H; NCH$_3$), 6.36 (dd, J=2.6 and 8.8, 2 H; H-2/7), 6.43 (d, J=2.5, 2 H; H-4/5), 6.68 (d, J=8.7, 2 H; H-1/8), 7.72 (br. s, 1 H; H-7'), 7.87 (d, J=8.0, 1 H; H-4'), 8.08 (dd, J=1.2 and 8.0, 1 H; H-5'). $^{13}$C NMR (CDCl$_3$, 75.5 MHz, ppm), δ=40.3 (NCH$_3$), 49.4 (C; C-1'), 78.2 (C; CN$_2$), 99.7 (CH; C-4/5), 107.9 (C; C-8a/8b), 109.2 (CH; C-2/7), 122.3 (CH), 127.3 (CH), 128.3 (CH; C-1/8), 130.1 (CH), 135.0 (C), 138.8 (C), 151.3 (C; C-3/6), 152.3 (C; C-4a/4b), 156.2 (C), 169.7 (CO$_2$H), 186.1 (CO).

Compound 23-H, HPLC: t$_R$=8.8 min.

NHS-Esters 22/23-NHS were prepared from 22/23-H with a ratio of 22-H/23-H=ca. 2:3. Compound 22/23-H (130 mg, 0.28 mmol) and N,N,N',N'-tetramethyl-O-(N-succinimidyl) isourea tetra-fluoroborate (0.15 g, 0.5 mmol) were dissolved in dry DMF (2 mL), and iPr$_2$NEt (0.2 mL) was added. The reaction mixture became dark. After stirring for 2 h at room temperature, the solvent was evaporated in vacuo (1 mbar), and the residue was dissolved in small amount of CH$_2$Cl$_2$ and applied onto a pad of SiO$_2$ (25 g). Elution with EtOAc followed by evaporation of the yellow eluate afforded the title compounds (0.125 g, 81%) as a yellow foam which crystallized by triturating with hexane-EtOAc mixture. $^1$H NMR ([D$_6$] DMSO, 300 MHz, signals of the major isomer 23-NHS are marked with *, ppm), δ=2.92 (s, 16 H; NCH$_3$ and CH$_2$CH$_2$), 6.43 (dd, J=2 and 9; H-2/7), 6.48 (d, J=2., Σ 4 H; H-4/5), 6.78 (2×d, J=9, 2 H; H-1/8), 7.29* (d, J=8; H-7'), 7.58 (d, J=2; H-7'), 8.02 (d, J=8; H-4'), 8.08 (dd, J=2 and 8; H-5'), 8.25* (dd, J=2 and 8; H-6'), 8.32* (d, J=2; H-4'); ESI-MS, positive mode: m/z (rel. int., %)=574 (100) [M+Na]$^+$. HPLC: t$_R$=11.2/12.2 min (ratio ca. 4:1 in the analytical sample after additional purification by chromatography and precipitation from CH$_2$Cl$_2$ with hexane)

Diazoketone 25: Rhodamine 24 (0.14 g, 0.25 mmol) was dissolved in CH$_2$Cl$_2$ (5 mL), and (COCl)$_2$ (0.4 mL, 3.5 mmol) was added to the flask. The mixture was kept at room temperature for 2 h. Then the solvent and excess of (COCl)$_2$ were removed in vacuo. The residue was dissolved in CH$_2$Cl$_2$ (5 mL); Et$_3$N (0.10 mL, 0.7 mmol) and a solution of Me$_3$SiCHN$_2$ in Et$_2$O (0.5 mL of 2 M solution, 1 mmol) were added at room temperature with stirring. The reaction mixture was kept at room temperature for 11 h. The solvent and excess of Me$_3$SiCHN$_2$ were removed in vacuo, and the title product was isolated from the residue by column chromatography (CH$_2$Cl$_2$/EtOAc (10:1)). After crystallization from CH$_2$Cl$_2$/n-hexane mixture (1:3), the pure diazoketone 25 (28 mg, 20%) was obtained. $^1$H NMR (CDCl$_3$, 300 MHz, ppm), δ=1.19 (t, J=7.1, 6 H; (CH$_2$)CH$_3$), 3.47 (q, J=7.1, 4 H; NCH$_2$ (CH$_3$)), 3.82 (q, J=8.9, 4 H; NCH$_2$(CF$_3$)), 6.40 (dd, J=2.7 and 8.8, 2 H; H-2/7), 6.52 (d, J=2.7, 2 H; H-4/5), 6.73 (d, J=8.8, 2 H; H-1/8), 7.05 (br. d, J=7.4, 1 H; H-7'), 7.36-7.50 (m, 2 H; H-5' and H-6'), 7.82 (br. d, J=7.3, 1 H; H-4'). $^{13}$C NMR (CDCl$_3$, 75.5 MHz, ppm), δ=11.5 ((CH$_2$)CH$_3$), 45.8 (NCH$_2$ (CH$_3$)), 48.8 (C; C-1'), 52.2 (q, J=33; NCH$_2$(CF$_3$)), 77.2 (C; CN$_2$), 100.3 (CH; C-4/5), 109.3 (CH; C-2/7), 110.6 (C; C-8a/8b), 122.3 (CH; C-7'), 125.4 (q, J=281; CF$_3$), 125.5 (CH; C-4'), 128.5 (CH; C-5'), 128.9 (CH; C-1/8), 134.59 (CH; C-6'), 134.71 (C; C-2'), 148.1 (C; C-3/6), 152.3 (C; C-4a/4b), 155.8 (C; C-3'), 187.0 (CO). EI-MS: m/z (rel. int., %)=574 [N]$^+$ (8), 546 [M-N$_2$]$^+$ (100), 531 [M-N$_2$—CH$_3$]$^+$ (4), 477 [M-N$_2$—CF$_3$]$^+$ (6).

Rhodamine 28: A mixture of compound 26 (0.60 g, 2.6 mmol), trimellitic anhydride monomethyl ester 19-Me (0.60 g, 2.9 mmol), and 1,2-dichlorobenzene (3 mL) was heated at 200° C. with stirring under N$_2$ for 5 min. The reaction mixture was cooled, another portion of compound 26 (0.60 g, 2.6 mmol) was added, and the mixture was heated at 200° C. with stirring under N$_2$ for 14 h. Then the solvent was removed in vacuo, a mixture of CH$_2$Cl$_2$ (20 mL) and MeOH (20 mL) was added to the residue, and the title product 28 (with ca. 10% of the minor diastereomer 27) was filtered off. The yield was 0.35 g (21%); m. p.=143-145° C. An additional portion of the diastereomeric mixture (0.38 g, 23%) precipitated from the filtrate in one day. $^1$H NMR (CDCl$_3$, 300 MHz, ppm), δ=1.80-1.94 (m, 4 H; (CH$_2$)Cl$_2$ (CH$_2$)), 2.42-2.64 (m, 4 H; ArCH$_2$ (CH$_2$)), 3.37 (t, J=5.5, 4 H; NCH$_2$(CH$_2$)), 3.70-3.98 (m, 7 H; NCH$_2$(CF$_3$) and OCH$_3$), 6.24 (s, 2 H), 6.46 (s, 2 H), 7.79 (br. s, 1 H; H-7'), 8.04 (d, J=8.0, 1 H; H-4'), 8.25 (dd, J=1.3 and 8.0, 1 H; H-5'). ESI-MS, positive mode: m/z (rel. int., %)=633 (100) [M+H]$^+$, 655 (20) [M+Na]$^+$. C$_{32}$H$_{26}$F$_6$N$_2$O$_5$, HR-MS (ESI, positive mode): 633.1816 [M+H]$^+$ (found). 633.1819 (calculated).

Diazaketone 29: (COCl)$_2$ (0.5 mL, 6 mmol) was added to a suspension of compound 28 (0.33 g, 0.5 mmol) in CH$_2$Cl$_2$ (5 mL) with stirring at room temperature. The mixture was kept at room temperature for 0.5 h. Then the solvent and excess of (COCl)$_2$ were removed in vacuo. The residue was dissolved in THF (4 mL). Et$_3$N (0.7 mL, 5 mmol) and a solution of Me$_3$SiCHN$_2$ in Et$_2$O (1 mL of 2 M solution, 2 mmol) were added to the reaction mixture at with stirring and cooling with a water bath. The reaction mixture was stirred at room temperature for 14 h. Then the solvent and excess of Me$_3$SiCHN$_2$ were removed in vacuo, and the title product was isolated from the residue by column chromatography (CH$_2$Cl$_2$/MeOH (10:1)). Additional purification by column chromatography with another eluent (CH$_2$Cl$_2$/n-hexane (2:1)) afforded the pure compound 29 (25 mg, 8%). HPLC: t$_R$=22.5 min. $^1$H NMR (CDCl$_3$, 300 MHz, ppm), δ=1.76-1.92 (m, 4H; (CH$_2$) CH$_2$(CH$_2$)), 2.42-2.64 (m, 4 H; ArCH$_2$(CH$_2$)), 3.26-3.40 (m, 4 H; NCH$_2$(CH$_2$)), 3.70-3.97 (m, 7 H; NCH$_2$(CF$_3$) and OCH$_3$), 6.36 (s, 2 H), 6.40 (s, 2 H), 7.67 (br. s, 1 H; H-7'), 7.87 (d, J=8.0, 1 H; H-4'), 8.07 (dd, J=1.4 and 8.0, 1 H; H-5'). $^{13}$C NMR (CDCl$_3$, 75.5 MHz, ppm), δ=21.7 (CH$_2$)CH$_2$(CH$_2$)), 27.2 (ArCH$_2$(CH$_2$)), 48.9 (C; C-1'), 50.8 (NCH$_2$(CH$_2$)), 52.4 (OCH$_3$), 53.6 (q, J=33; NCH$_2$(CF$_3$)), 79.0 (CN$_2$), 98.7 (CH; C-4/5), 108.6 (C), 119.4 (C), 122.2 (CH), 125.5 (q, J=281; CF$_3$), 126.9 (CH), 128.0 (CH; 0-1/8), 129.7 (CH), 135.7 (C), 138.2 (C), 145.2 (C), 150.4 (C), 155.9 (C), 166.1 (CO$_2$CH$_3$), 186.2 (C). ESI-MS, positive mode: m/z (rel. int., %)=657 (17) [M+H]$^+$, 679 (100) [M+Na]$^+$. C$_{33}$H$_{26}$F$_6$N$_4$O$_4$, HR-MS (ESI, positive mode): 657.1930 [M+H]$^+$ (found). 657.1931 (calculated).

Carboxylic acid 30: Ester 29 (25 mg, 0.039 mmol) was dissolved in THF (4 mL); H$_2$O (1 mL) and MeOH (5 mL) were added under N$_2$. Then 1 M aq. NaOH (0.5 mL) was added to the reaction mixture and it was kept at room temperature for 16 h. Then the reaction mixture was acidified with 1 M aq. HCl (0.5 mL), volatile solvents were removed in vacuo, and the residue was dissolved in H$_2$O (20 mL). The solution was carefully acidified with 1 M aq. HCl to pH=6, and the title product was extracted with CH$_2$Cl$_2$. The organic solutions were dried with Na$_2$SO$_4$, and the solvent was removed in vacuo. Yield –24 mg (ca. 100%). HPLC: t$_R$=18.0 min. $^1$H NMR (CDCl$_3$, 300 MHz, ppm), δ=1.76-1.92 (m, 4H; (CH$_2$)CH$_2$(CH$_2$)), 2.42-2.64 (m, 4 H; ArCH$_2$(CH$_2$)), 3.26-3.40 (m, 4 H; NCH$_2$(CH$_2$)), 3.81 (q, J=9.0, 4 H; NCH$_2$(CF$_3$)), 6.36 (s, 2 H), 6.39 (s, 2 H), 7.71 (br. s, 1 H; H-7'), 7.89 (d, J=7.2, 1 H; H-4'), 8.09 (br. d, J=7.2, 1 H; H-5'). $^{13}$C NMR (CDCl$_3$, 125.7 MHz, ppm), δ=21.8 (CH$_2$)CH$_2$(CH$_2$)), 27.2 (ArCH$_2$(CH$_2$)), 49.0 (C; C-1'), 50.8 (NCH$_2$(CH$_2$)), 53.6 (q, J=33; NCH$_2$(CF$_2$)), 78.4 (CN$_2$), 98.8 (CH; C-4/5), 108.5 (C), 119.4 (C), 122.3 (CH), 125.5 (q, J=284; CF$_3$), 127.5 (CH), 127.9 (CH; 0-1/8), 130.2 (CH), 134.9 (C), 138.7 (C), 145.3 (C), 150.5 (C), 156.0 (C), 170.0 (CO$_2$H), 186.2 (CO). ESI-MS, positive mode: m/z (rel. int., %)=665 (100) [M+Na]$^+$, 1307 (50) [2M+Na]$^+$. C$_{32}$H$_{24}$F$_6$N$_4$O$_4$, HR-MS (ESI, positive mode): 665.1592 [+Na]$^+$ (found). 665.1594 (calculated).

1,2,3-Thiadiazole 31: A mixture of compound 10 (53 mg, 0.11 mmol), Lawesson's reagent (48 mg, 0.12 mmol), and benzene (3 mL) was refluxed under N$_2$ for 1 h. The reaction mixture was cooled, and the solution was decanted from the tarry residue. The solvent was evaporated under reduced pressure, and the crude product was isolated from the residue by column chromatography (CHCl$_3$/n-hexane, 1:1), yield –13 mg (24%). Another portion of the title product 31 was isolated from the tarry residue by column chromatography (CHCl$_3$/

MeOH 20:1); total yield ~27 mg (50%). HPLC (A/B:70/30→0/100 in 25 min): $t_R$=8.1 min.

$^1$H NMR (CDCl$_3$, 300 MHz, ppm), δ=1.12 (t, J=7.1, 12 H; (CH$_2$)CH$_3$), 3.29 (q, J=7.1, 8 H; NCH$_2$(CH$_3$)), 6.06-6.24 (m, 4 H), 6.47 (br.s, 2 H), 7.27-7.40 (m, 3 H), 7.42-7.48 (m, 1 H), 7.66 (br. d, J=6.8, 1 H). ESI-MS, positive mode: m/z (rel. int., %)=483 (90) [M+H]$^+$, 505 (5) [M+Na]$^+$, 965 (100) [2M+H]$^+$. C$_{29}$H$_{30}$N$_4$OS, HR-MS (ESI, positive mode): 505.2036 [M+Na]$^+$ (found). 505.2033 (calculated).

Photolysis of 1,2,3-thiadiazole 31: A solution of compound 31 (60 mg, 0.12 mmol) in MeOH (200 mL) was placed into a photolysis reactor, and nitrogen was bubbled through a solution for 30 min at room temperature with stirring. Then the reaction mixture was irradiated at ambient temperature with stirring under N$_2$ for 2.5 h, until the starting compound could not be detected by HPLC. The solvent was removed in vacuo. More then 10 new compounds were detected in the reaction mixture (HPLC). The main product—thioester 32—was isolated by preparative HPLC as a dark red solid. HPLC (A/B: 70/30→0/100 in 25 min): $t_R$=20.6 min. UV (MeOH): $\lambda_{max}$=559 nm, $\lambda_{em}$=580 nm, $\Phi_{fl}$=0.46. ESI-MS, positive mode: m/z (rel. int., %)=487 (100) [M]$^+$. C$_{30}$H$_{35}$N$_2$O$_2$S (+), HR-MS (ESI, positive mode): 487.2405 [M]$^+$ (found). 487.2414 (calculated).

EXAMPLE 2

Imaging Subcellular Structures with the New Caged Fluorescent Dye Compounds 22/23

For imaging subcellular structures with photoactivable dyes in living cells, the photoactivable dyes have to fulfil (at least) two criteria: i) the fluorescent dyes must be able to pass cellular membranes and ii) the photoactivation process must be possible under aqueous conditions (i.e. cell culture medium or other live compatible buffered solutions). To determine if compounds 22/23 meets these criteria, mammalian PtK2 cells were incubated for 2 hours in ~1 ml of staining solution (1 ml culture medium containing 3 μl of the saturated solution of compounds 22/23-NHS in DMSO) under cell culture conditions and subsequently for 5 minutes in cell culture medium without dye (for washing). After this, the stained cells were imaged before and after photoactivation (FIG. 1A). Imaging (exc.: 570/20 nm; det.: 640/40 nm; intensity: 30 μW/imaged area; exposure time: 20 ms) and switching (activation: 420/30 nm; intensity in the sample: 8 μW/imaged area; exposure time: 20 ms) was performed in an epifluorescence microscope (DM6000B; equipped with a 100×1.4 NA oil objective and a mercury arc lamp; Leica Microsystems, Wetzlar, Germany). Thereby we found that compounds 22/23 penetrate the cell and stain predominantly mitochondria in living cells. It is readily photoactivatable. Thus, compounds 22/23 meet both criteria for live cell imaging named above.

Next, the switching behaviour of compounds 22/23 in apolar, buffered mounting media like Mowiol (with DABCO) was determined. These embedding media are frequently utilized for imaging fixed cells which are labelled by immunocytochemistry or related approaches. To check the new compound for photoactivation in Mowiol, the microtubule cytoskeleton of formaldehyde fixed cells was immunolabeled according to standard procedures. After embedding in Mowiol (containing DABCO), the samples were imaged and switched as described above. It was found that compounds 22/23-NHS can readily be coupled to antibodies that retain their ability to be used for immunocytochemistry. Furthermore, it was found that compounds 22/23 may be photoswitched in Mowiol enabeling imaging in fixed and embedded cells (FIG. 1B).

Analyzing the images, the present inventors determined the increase of the fluorescence signal upon switching to be of a factor of >40 in living cells. In fixed cells embedded in Mowiol, a relatively larger fraction of non-irradiated compounds 22/23 was in the fluorescent state. The increase of the fluorescence signal upon switching was around 10 fold.

FIG. 1. illustrates the switching of compounds 22/23 in living and fixed eukaryotic cells. (A) Compounds 22/23 switched in living cells. For staining, mammalian Ptk2 cells were incubated for 2 hours in ~1 ml of staining solution (1 ml culture medium containing 3 μl of saturated solution of 22/23-NHS in DMSO) under cell culture conditions. Under these conditions the mitochondria are preferentially labelled. Imaging (exc.: 570/20 nm; det.: 640/40 nm; intensity: 30 μW/imaged area; exposure time: 20 ms) and switching (activation: 420/30 nm; intensity: 8 μW/imaged area; exposure time: 20 ms) were performed with an epifluorescence microscope (equipped with a mercury arc lamp). After switching of living cells, the fluorescence signal rises by a factor of >40. (B) Compounds 22/23-NHS were be coupled to antibodies, introduced into fixed cells and switched in Mowiol. Here, the microtubule cytoskeleton was labelled. After embedding in Mowiol containing DABCO, the samples were imaged and switched as indicated above. After switching the fluorescence signal rises by a factor of ~10. For comparison, the color table was kept constant for the respective images.

EXAMPLE 3

Determination of Intensity-Dependent Switching Kinetics

To determine the photoinduced switching kinetics of compounds 22/23, the inventors immunolabelled the tubulin cytoskeleton in fixed mammalian cells with secondary antibodies coupled with compounds 22/23-NHS (as indicated above), and mounted the cells in Mowiol containing DABCO. Then the switching kinetics were determined while photoactivating the dye either with low light intensities (3 μW/imaged area) or higher light intensities (70 μW/imaged area). To this end the samples were subjected to several imaging-switching cycles. For the low light intensities each cycle consisted of 200 ms of imaging (exc.: 570/20 nm; det.: 640/40 nm; intensity: 11 μW/imaged area) and 1 ms of switching (activation: 420/30 nm; intensity: 3 μW/imaged area). For the higher light intensities imaging and switching was performed as indicated above, but exposure times and light intensities were modified (Imaging: exc.: 570/20 nm; det.: 640/40 nm; intensity: 200 μW/imaged area; exposure time: 20 ms; Activation 420/30 nm; intensity: 70 μW/imaged area; exposure time: 1 ms). The fluorescence signal of the individual images was summed up and normalized to the brightest image and displayed in a graph (FIG. 2). Using the lower light intensity, the course of the increase in the fluorescence signal follows saturation kinetics. In case of the higher light intensities, after 15 ms switching the fluorescence signal decreases after an initial raise, likely because of photobleaching superseding photoactivation. The kinetic data demonstrate that compound(s) 22/23 may be utilized for various applications including superresolution microscopy and protein tracking applications.

FIG. 2 demonstrates intensity dependent switching kinetics. (A) Kinetics under low light intensities. Immunolabeling of the microtubule cytoskeleton of formaldehyde fixed cells with the secondary antibodies coupled with compounds 22/23-NHS was performed according to standard procedures. To evaluate the switching kinetics, after embedding in Mowiol (containing DABCO), the samples were subjected to several imaging-switching cycles using an epifluorescence microscope (DM6000B, equipped with a 100×1.4 NA oil objective and a mercury arc lamp; Leica Microsystems, Wetzlar, Germany). Each cycle consisted of 200 ms of imaging (exc.: 570/20 nm; det.: 640/40 nm; intensity: 11 µW/imaged area) and 1 ms of switching (activation.: 420/30 nm; intensity: 3 µW/imaged area). The brightness of the individual images was summed up and normalized to the brightest image and displayed in the corresponding graph. (B) Kinetics under higher light intensities. Staining, imaging and switching was performed as described above, but exposure times and light intensities were modified (Imaging: exc.: 570/20 nm; det.: 640/40 nm; intensity in sample: 200 µW/imaged area; exposure time: 20 ms; activation: 420/30 nm; intensity in sample: 70 µW/imaged area; exposure time: 1 ms). Analysis of the kinetics of photoactivation as in (A). For comparison, the color table was kept constant.

EXAMPLE 4

Tracking of Proteins and Organelles within Living Cells

To determine whether the dynamics of proteins, organelles and other subcellular structures can be analyzed with compound 22/23, living mammalian PtK2 cells were stained with compound 22/23-NHS as described above. Switching and imaging was performed using a confocal microscope (TCS SP5 equipped with a 1.4 NA oil immersion objective, a 405 nm diode laser and a 461 nm diode laser, respectively, Leica Microsystems, Mannheim, Germany). The whole field of view was imaged, but only a part of the field of view (region of interest, ROI) was irradiated with 405 nm to activate compound 22/23. The photomultiplier sensitivity was set in a way, that before switching no fluorescence signal was detectable upon irradiation with 561 nm laser light (FIG. 3). After 30 ms switching with 405 nm laser light (within the ROI) brightly fluorescent structures—predominantly mitochondria and vesicles—were visible within photoactivated areas. After 330 ms of further irradiation, bright structures were not only visible within switched areas but also in the rest of the cell. The fluorescent structures outside of the ROI are due to movement of the highlighted structures within the cells, demonstrating that compound 22/23 can be used for live cell tracking experiments.

FIG. 3 illustrates the tracking of proteins and organelles within living cells. Prior to imaging and switching in a confocal microscope (TCS SP5, Leica Microsystems, Mannheim, Germany), mammalian PtK2 cells were incubated for 2 hours in ~1 ml of staining solution (1 ml culture medium containing 3 µL of the saturated solution of 22/23-NHS in DMSO) under cell culture conditions. (A) Before switching (t=0) no fluorescence signal was detected upon irradiation with 561 nm laser light. After 30 ms switching (t=30") with 405 nm laser light within the ROI (indicated by a dashed box), a strong fluorescence signal was visible within the photoactivated areas. After 330 ms of further irradiation (t=360"), bright structures were not only visible within switched areas but also in the rest of the cell. (B) Close-up of (A) t=363" to t=390". Movement of individual vesicles, containing photactivated compound 22/23 is visible and can be tracked within living cells. For comparison, the color table was kept constant.

EXAMPLE 5

Single Molecule Switching Experiments

To successfully use a dye in single molecule switching (SMS) experiments, it is essential that the dye can be switched between a dark and a bright state, and that one of these transitions is light-driven. Furthermore, to achieve high localisation accuracy, it is necessary that a single molecule emits a large number (thousands) of photons before being bleached or being switched off. The localisation accuracy (and thus the resolution enhancement) is inversely proportional to the square root of the number of emitted photons.

Both of these prerequisites for SMS are satisfactorily fulfilled by the compound 22/23. To demonstrate this, the microtubule cytoskeleton in fixed mammalian cells was immunolabelled with the secondary antibodies bearing the residues of the compound 22/23 (as described above), and the cells were coated with PVA. The samples were imaged in a widefield setup with a fast EMCCD-camera using a 532 nm laser for excitation and a 375 nm laser for "uncaging". Thereby we could apply compound 22/23 successfully for imaging of the microtubule cytoskeleton with SMS. The measured localisation accuracy in the lateral directions was at least ~55 nm (~4 times better than the resolution of confocal microscopes and more than 5 times better than the diffraction limited resolution of the used microscope).

FIG. 4. Conventional microscopic image (A) and single molecule switching (SMS) nanoscopic image (B) of the microtubule network in a whole fixed PtK2 cell immunolabelled with secondary antibodies conjugated with compounds 22/23-NHS. For preparation of the samples, mammalian PtK2 cells were grown on cover slips, fixed with formaldehyde, extracted, blocked and finally immunolabelled using a tubulin specific primary plus a dye labelled secondary antibody. After coating with PVA, the samples were imaged using a 532 laser for excitation and a 375 nm laser for switching. The left side of the cell (A) is displayed as superposition (an "add up") of the intensity of 28000 frames taken in this experiment, exemplifying the resolution, a conventional diffraction-limited image would achieve. The right side of the same cell (B) is displayed as histogram representation of the acquired data providing the diffraction-unlimited optical super-resolution. Using compound 22/23 in SMS, a localisation accuracy of at least ~55 nm was measured by analysing the data and evaluating an agglomeration of dye molecules.

The invention claimed is:
1. Photoactivable rhodamine or carbopyronine derivative compounds of the following general formulae G1-G4 comprising UV light absorbing chromophores which are adapted to eliminate nitrogen or nitrogen(I) oxide and generate fluorescent rhodamine or carbopyronine dyes when subjected to photolysis by irradiation at 254-490 nm

G1 - G4

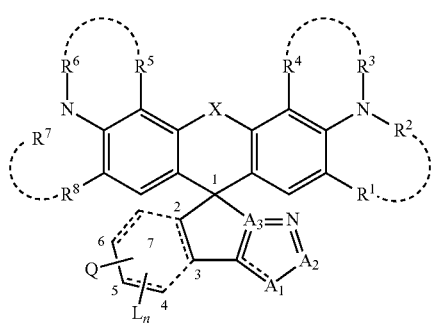

II

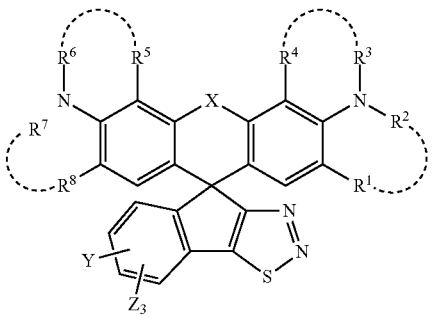

III

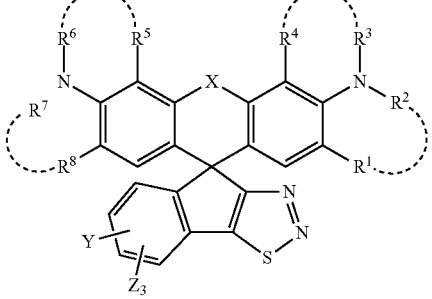

G1: A1=O, A2=N, A3=C;
G2: A1=S, A2=N, A3=C;
G3: A1=O, A2=O, A3=N;
G4: A1=S, A2=O, A3=N;

wherein $R^1$, $R^2$, ($R^1$-$R^2$), $R^3$, $R^4$, ($R^3$-$R^4$), $R^5$, $R^6$, ($R^5$-$R^6$), $R^7$, $R^8$, ($R^7$-$R^8$)=H, unsubstituted or substituted alkyl (cycloalkyl), unsubstituted or substituted cycloalkenyl, unsubstituted or substituted heterocylic residue, unsubstituted or substituted aryl, unsubstituted or substituted hetaryl; and X=O, S, C(CH$_3$)$_2$;

a chemical bond between C-2 and C-3 is a single or cis-double bond;

alternatively, C-2 and C-3 is a part of any cyclic system;

and at least one of the substituents Q and L is independently defined as follows (n=0, 1, 2, 3 or 4): H, COOR$^9$, COCH=N=N, CH$_2$COOR$^9$, N(R$^1$ ... R$^2$), NR$^{10}$R$^{11}$, SR$^{12}$, F, Cl;

wherein R$^9$=H, unsubstituted or substituted alkyl, cycloalkyl, or heterocyclic residue, N-succinimidyl, N-sulfosuccinimidyl, unsubstituted or substituted phenyl, aryl or hetaryl; R$^{10}$, R$^{11}$=C=S, C=O; R$^{12}$=H, (CH$_2$)$_m$COOR$^9$ wherein m is an integer from 1 to 11, unsubstituted or substituted alkyl, cycloalkyl, heterocyclic residue, aryl or hetaryl.

2. Compounds according to claim 1 of the general formulae I-III wherein R$^1$, R$^2$, (R$^1$-R$^2$), R$^3$, R$^4$, (R$^3$-R$^4$), R$^5$, R$^6$, (R$^5$-R$^6$), R$^7$, R$^8$, (R$^7$-R$^8$)=H, unsubstituted or substituted alkyl (cycloalkyl), unsubstituted or substituted cycloalkenyl, unsubstituted or substituted heterocylic group, unsubstituted or substituted aryl, unsubstituted or substituted hetaryl; and X=O, S, C(CH$_3$)$_2$; Y=COOR$^9$, COCH=N=N, CH$_2$COOR$^9$, N(R$^1$ ... R$^2$), NR$^{10}$R$^{11}$, SR$^{12}$, F, Cl; Z=H, F, Cl; W=O, S; R$^9$=H, unsubstituted or substituted alkyl, cycloalkyl, or heterocyclic residue, N-succinimidyl, N-sulfosuccinimidyl, unsubstituted or substituted phenyl, aryl or hetaryl; R$^{10}$, R$^{11}$=C=S, C=O; R$^{12}$=H, (CH$_2$)$_m$COOR$^9$ (m=1-11), unsubstituted or substituted alkyl, cycloalkyl, heterocyclic residue, aryl or hetaryl.

3. Compounds according to claim 2 selected from the group of compounds 10, 17, 18, 22-Me, 23-Me, 22-Et, 23-Et, 22-H, 23-H, 22-NHS, 23-NHS, 25, 29, 30 and 31 below

I

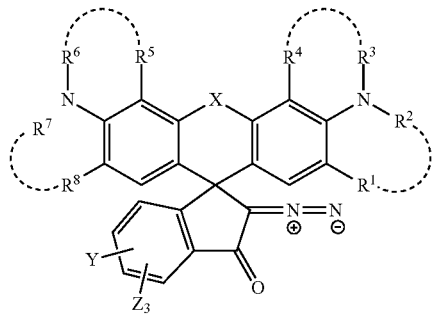

10

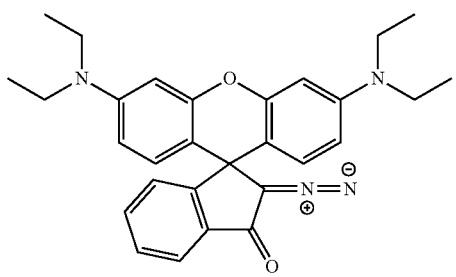

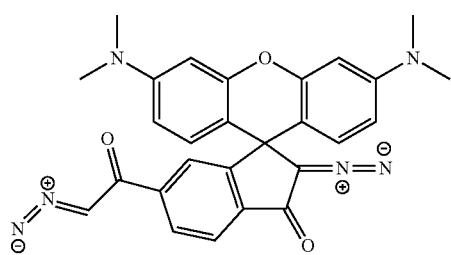

17

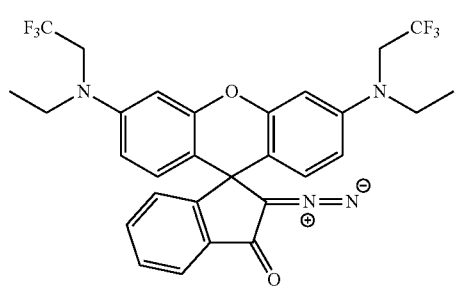

25

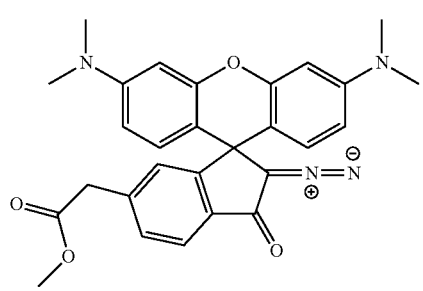

18

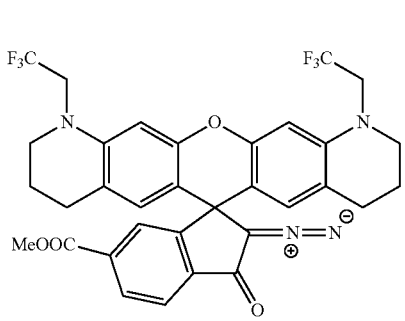

29

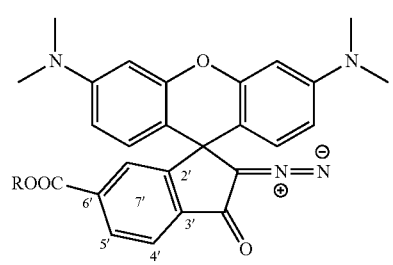

22-R

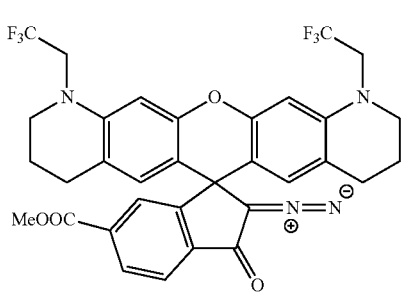

30

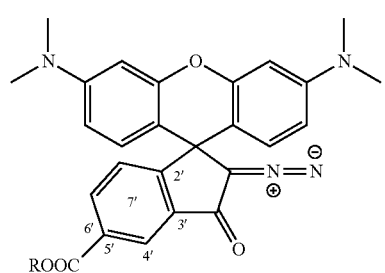

23-R

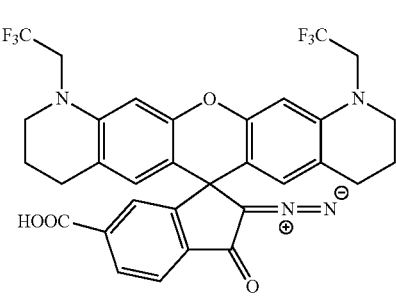

30

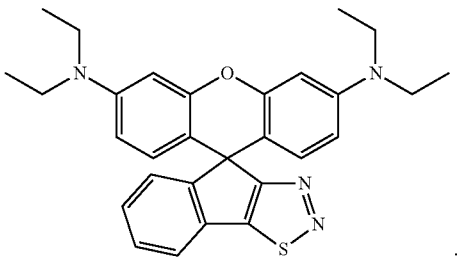

31

R = Me, Et, H, NHS

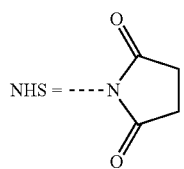

NHS =

4. A method for preparing compounds of the general formulae I and II according to claim 2, comprising the steps:

a) converting a spiro-9H-xanthene or 9,10-dihydroanthracene starting compound 4-X as depicted in the following scheme (or their synthetically equivalent open forms having a free carboxylic group) into a corresponding acid halide 5-X;

b) reacting compound 5-X with a diazomethane compound to produce a diazoketone I; and c) optionally reacting compound I with a thionating agent to produce a 1,2,3-thiadiazole derivative II

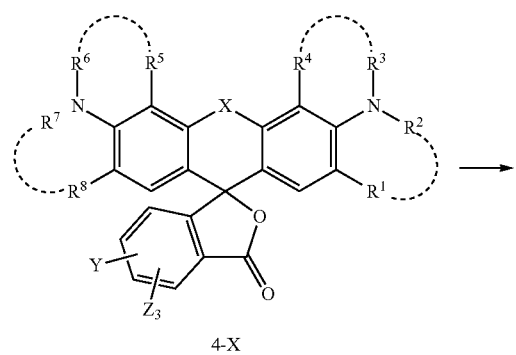
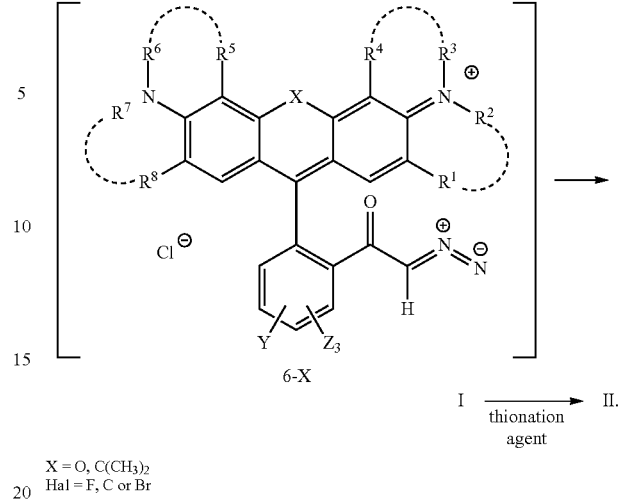
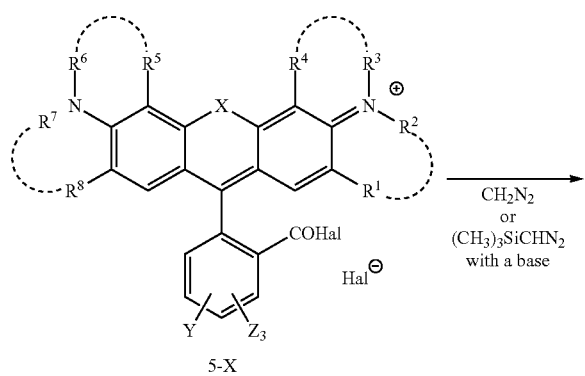

X = O, C(CH$_3$)$_2$
Hal = F, C or Br

5. A method for preparing compounds of the general formula III according to claim 2, comprising the steps:
 a) converting an acid halide 5-X or alkyl ester 8-X as depicted in the following scheme into an amide 7-X;
 b) reacting compound 7-X with a thionation agent to produce a corresponding thioamide 9-X;
 c) deprotonation of the amide 7-X or thioamide 9-X with a strong base followed by the reaction with a nitrosation agent

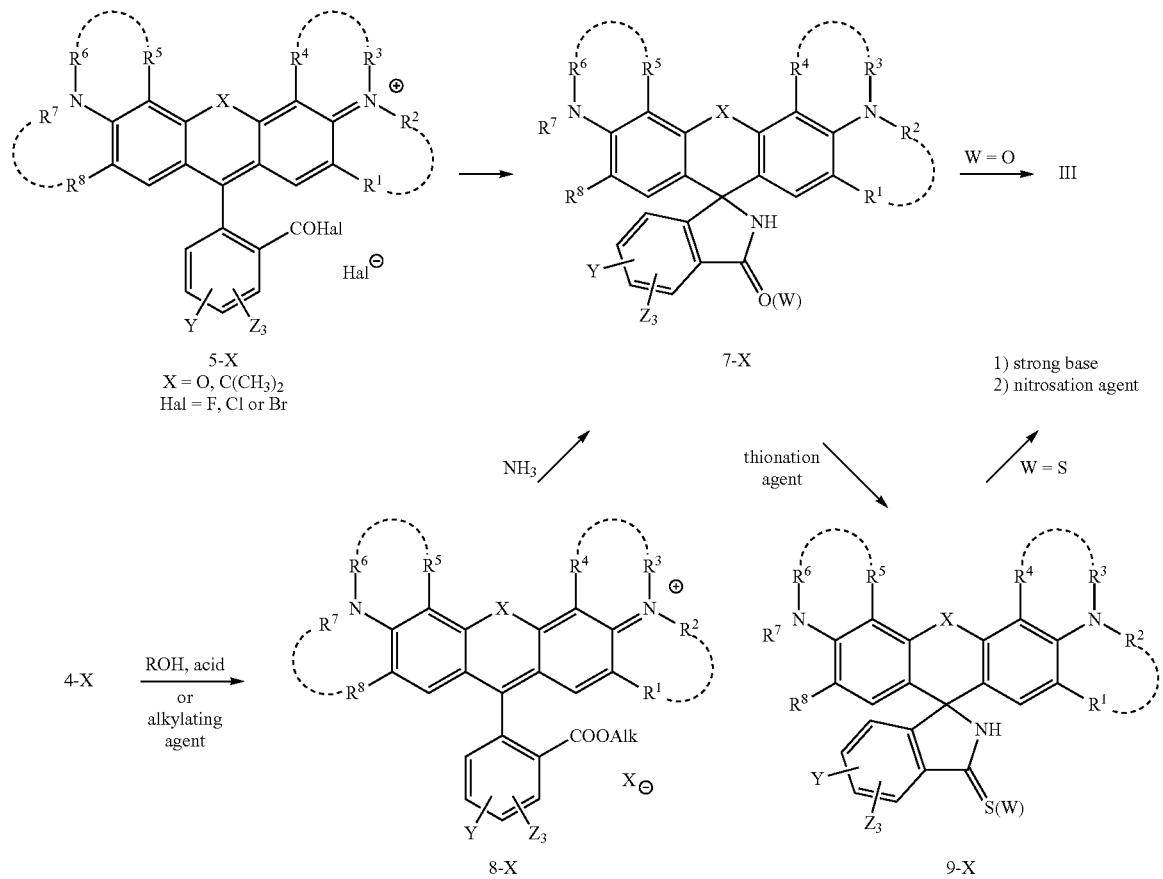

6. A method of conjugation or bioconjugation, which comprises forming at least one covalent chemical bond or at least one molecular complex comprising compound according to claim 1 and a chemical entity, substance or object.

7. The method according to claim 6 wherein the chemical entity or substance is a peptide, protein, carbohydrate, nucleic acid, toxin, or lipid.

8. The method according to claim 7 wherein the conjugation or bioconjugation comprises formation of two or more covalent chemical bonds and/or molecular complexes.

9. The method according to claim 8 wherein compounds 22-NHS, 23-NHS, 17 and 30

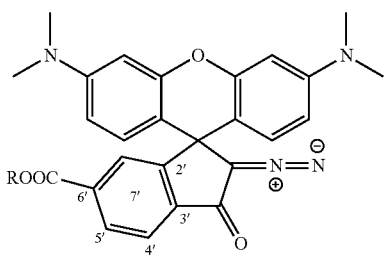

22-R

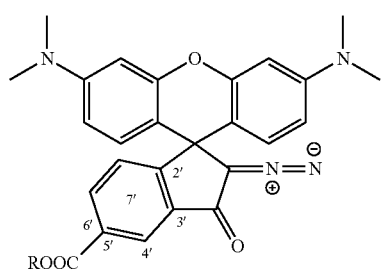

23-R

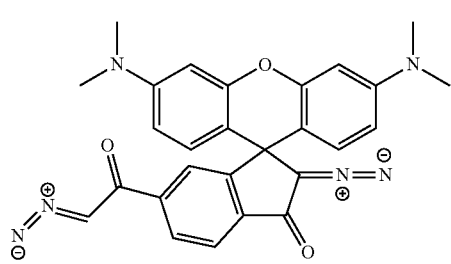

17

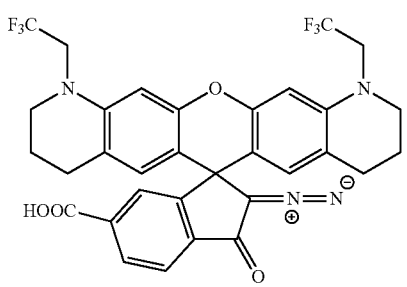

30 where R is

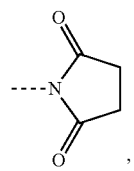

with two functional groups are used as (cross)linking reagents.

10. A bioconjugation method comprising forming at least one covalent chemical bond or at least one molecular complex comprising a compound according to claim 1 and an antibody.

11. A photoactivatable fluorescent dye composition comprising compounds according to claim 1 or their conjugates as photoactivable fluorescent dyes.

12. A method of marking a cell comprising incorporating into the cell the compounds according to claim 1 or their conjugates as cell permeable substances penetrating through membranes of living and fixed cells in a masked non-fluorescent form represented by the structural formulae G1-G4.

13. A method of tracking and monitoring dynamic processes in a sample or in an object, comprising associating the sample or object with the compounds according to claim 1 or their conjugates, and photoactivating the compounds or their conjugates for tracking and monitoring dynamic processes in the sample or in the object.

14. The method according to claim 13 wherein changes in a shape, dimensions and/or an intensity of a fluorescence signal obtained after photoactivation of the compounds or their conjugates correspond to changes of the sample or object or of its environment.

15. A method of using the compounds according to claim 1 or their conjugates as such or after photoactivation as labels in optical microscopy and imaging techniques, microfluidic devices, capillary electrophoresis, or protein tracking techniques, said method comprising labelling an object with the compounds or their conjugates and detecting the objects in an optical microscope, an imaging device, a microfluidic device, a capillary electrophoresis device or a protein tracking device.

16. The method according to claim 15 wherein the optical microscopy and imaging techniques are selected from the group consisting of stimulated emission depletion microscopy [STED], single molecule switching (SMS) "nanoscopy" (diffraction unlimited optical resolution by using switching of the fluorescence of the single molecules), fluorescence correlation spectroscopy [FCS], fluorescence recovery after photobleaching [FRAP], fluorescence lifetime imaging [FLIM], ground state depletion with individual molecular return [GSDIM], and fluorescence resonant energy transfer [FRET].

17. A method comprising labeling mitochondria with the compounds according to claim 1 or their conjugates as such or after photo-activation.

18. The method according to claim 17 wherein compounds 22-H, 22-NHS, 23-H, and 23-NHS

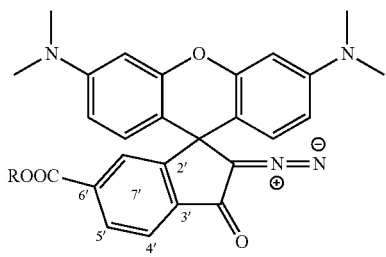 22-R
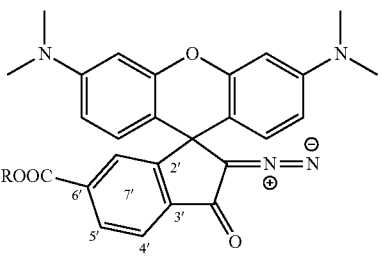 22-R
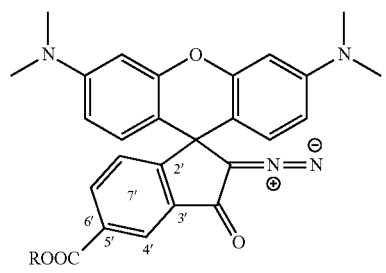 23-R
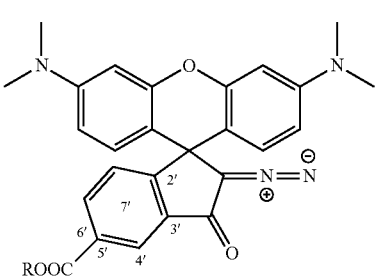 23-R
where R is H or
where R is H or
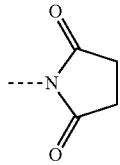
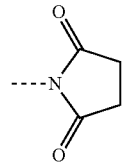
are used as labels specific for mitochondria.
19. A single molecule localization microscopy method comprising labelling a molecule with a compound selected from the group consisting of compounds 22-H, 22-NHS, 23-H and 23-NHS
\* \* \* \* \*